US012355654B1

(12) United States Patent
Holness

(10) Patent No.: US 12,355,654 B1
(45) Date of Patent: Jul. 8, 2025

(54) SOURCE ROUTING TECHNIQUES THAT UTILIZE ENCODED NETWORK PATHS

(71) Applicant: CIENA CORPORATION, Hanover, MD (US)

(72) Inventor: Marc Holness, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/596,116

(22) Filed: Mar. 5, 2024

(51) Int. Cl.
*G06F 15/173* (2006.01)
*H04L 45/00* (2022.01)
*H04L 45/02* (2022.01)
*H04L 45/24* (2022.01)

(52) U.S. Cl.
CPC .............. *H04L 45/02* (2013.01); *H04L 45/24* (2013.01); *H04L 45/566* (2013.01)

(58) Field of Classification Search
None
See application file for complete search history.

(56) References Cited

U.S. PATENT DOCUMENTS

| 6,496,477 B1* | 12/2002 | Perkins | H04L 45/24 370/228 |
| 2010/0091800 A1* | 4/2010 | Perkins | H04L 65/765 370/474 |
| 2018/0227221 A1* | 8/2018 | Starsinic | H04L 41/0895 |
| 2021/0153063 A1* | 5/2021 | Zhang | H04W 88/04 |

* cited by examiner

*Primary Examiner* — Phuoc H Nguyen
(74) *Attorney, Agent, or Firm* — Guntin & Gust, PLC; Ralph Trementozzi

(57) ABSTRACT

Aspects of the subject disclosure may include, for example, identifying a network topology that includes a group of nodes and a number of segment reference values corresponding to network segments between pairs of nodes of the group of nodes. A message including a path index that corresponds to a particular network path of an indexed arrangement of unique paths is received, at a node of the group of nodes. The particular network path includes a particular sequence of nodes corresponding to the path index. The path index is decoded to obtain a decoding of the particular network path and a next node along the network path is identified according to the decoding of the particular network path allowing the message to be forwarded to the identified next node. Other embodiments are disclosed.

20 Claims, 11 Drawing Sheets

950

US 12,355,654 B1

SOURCE ROUTING TECHNIQUES THAT UTILIZE ENCODED NETWORK PATHS

FIELD OF THE DISCLOSURE

The subject disclosure relates to source routing techniques that utilize encoded network paths.

BACKGROUND

Source routing refers to processes that allow a sender of a packet to partially or completely specify a route that the packet takes through the network. This approach may alleviate network elements or nodes along the packet rout from having to retain routing tables and/or perform calculations other than identifying a path or at least a next node according to the source routing process. In contrast, non-source routing protocols require network elements to determine the path based on some other process, such as the packet's destination, or based on label switching.

Source route bridging is used on token ring networks, which were standardized in IEEE 802.5. According to token ring applications, operation of the bridge could be simpler over alternatives, such as spanning tree protocols or layer 2 control plane protocols which could otherwise be used for network loop prevention. These alternative techniques would not be necessary in the token ring application in which much of the bridging functions could be performed by end systems, such as message sources.

A field in the Token Ring header, referred to as a routing information field (RIF), may be used to support Source Route bridging. Upon sending a packet, a host attaches a RIF to the packet indicating the series of bridges and network segments to be used for delivering the packet to its destination. The bridges merely follow the list given in the RIF. If a given bridge is next in the list, it forwards the packet, otherwise it ignores it. Segment routing is another way of implementing a source routing technique. Segment routing technology is based on a distribution of information, e.g., labels, segments, instructions, in the interior gateway protocol (IGP) or via a centralized controller.

Segment routing (SR) is a source routing technique that can provide network simplification, e.g., with respect to protocol and management. Segment routing removes and/or otherwise reduces network protocols and makes network operations easier. For example, in the case of multiprotocol label switching (MPLS) based SR, it does not require a label distribution protocol (LDP) or resource reservation protocol for traffic engineering (RSVP-TE) deployment. Instead, it can use an IGP to distribute labels and compute paths, without changing the existing MPLS forwarding architecture. Segment routing removes network state information from transit/interior routers and nodes in the network and places the path state information into packet headers at an ingress node. The state, i.e., a network "program," is not in the fabric. Segment routing reduces the number of nodes that need to be touched for path provisioning and changes. This action enables segment routing to be more responsive to network changes, making it more agile and flexible than other traffic-engineering solutions.

Segment routing is a source routing technique that can provide simplified traffic engineering, such as in the case of MPLS, e.g., MPLS-TE, to maintain the connection status, nodes need to exchange many refresh packets. This increases the control plane load. Segment Routing controls service paths only through label operations on the ingress. It does not require transit nodes to maintain path information, reducing the control plane load.

BRIEF DESCRIPTION OF THE DRAWINGS

Reference will now be made to the accompanying drawings, which are not necessarily drawn to scale, and wherein.

DETAILED DESCRIPTION

Figure 1:
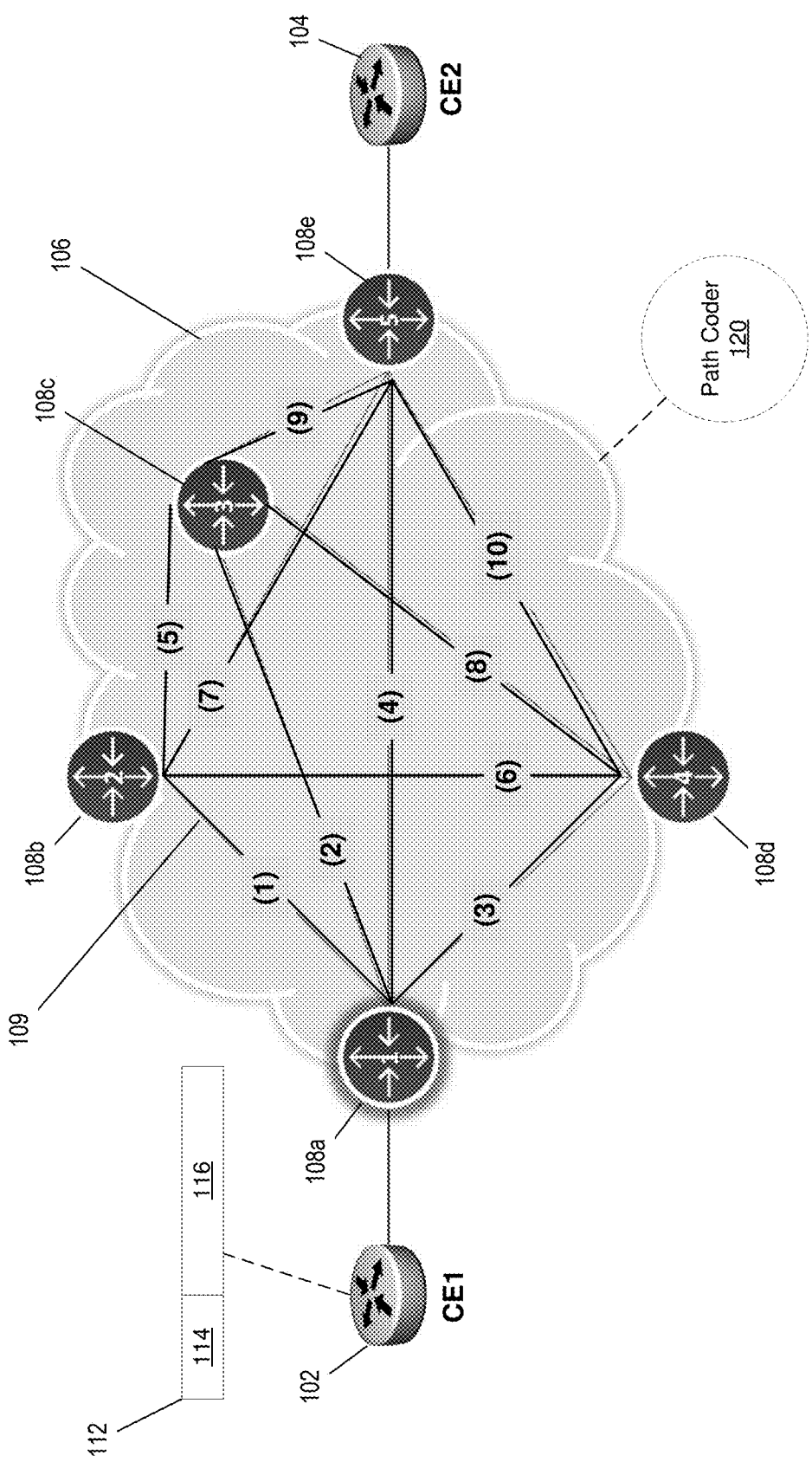
FIG. 1 is a block diagram illustrating an example, non-limiting embodiment of a five-node mesh network configured for path-indexed source routing in accordance with various aspects described herein.

The subject disclosure describes, among other things, illustrative embodiments for identifying a network topology and obtaining path references or index values that corresponds to a particular network path of an ordered arrangement of unique paths of the network topology, such that a decoding of the path index value identifies a next node along the network path. Other embodiments are described in the subject disclosure.

One or more aspects of the subject disclosure includes a device equipped with a processing system including a processor and a memory that stores executable instructions. The instructions, when executed by the processing system, facilitate performance of operations that include identifying a network topology including a group of nodes and a number of segment reference values corresponding to network segments between pairs of nodes of the group of nodes. The operations further include receiving a message including a path index that corresponds to a particular network path of an indexed arrangement of unique paths. The particular network path includes a particular sequence of nodes of the group of nodes corresponding to the path index. The operations further include decoding the path index to obtain a decoding of the particular network path and identifying a next node according to the decoding of the particular network path to obtain an identified next node. The message is forwarded to the identified next node.

One or more aspects of the subject disclosure include a non-transitory machine-readable medium, including executable instructions that, when executed by a processing system including a processor, facilitate performance of operations. The operations include identifying a network topology comprising a group of nodes and a number of segment reference values corresponding to network segments between pairs of nodes of the group of nodes. The operations further include identifying a group of unique network paths including all possible unique network paths supported by the network topology and arranging the group of unique network paths according to a prioritized order based on node labels of the group of nodes to obtain an arranged group of unique network paths. The operations further include encoding the arranged group of unique network paths into number of encoded path reference values and providing an encoded path reference value to a node of the group of nodes to facilitate identification of a particular unique network path of the group of unique network paths according to the encoded path reference value and without providing further network instruction related to the unique network path.

One or more aspects of the subject disclosure include a process that includes identifying, by a processing system including a processor, a network topology having a number of nodes and a number of segment reference values corresponding to network segments between pairs of nodes of the number of nodes. The process further includes receiving, by the processing system, a message including a path index, wherein the path index corresponds to a particular network path of an indexed arrangement of unique paths. The particular network path includes a particular sequence of nodes of the number of nodes corresponding to the path index. The process further includes decoding, by the processing system, the path index to obtain a decoding of the particular network path, and identifying, by the processing system, a next node according to the decoding of the particular network path to obtain an identified next node, wherein the message is forwarded to the identified next node.

Currently available network path encoding and/or decoding schemes rely on placement of a network path with a message, e.g., in a body of a message frame or packet header. For example, this may be accomplished using techniques such as expandable type length values (TLVs), and/or in a destination address of a frame. It may be appreciated that such overhead information should be reduced and/or minimized due to the limited address space of network messages. One such approach compresses a path compression, which includes data compression to an ordered sequence of instructions, e.g., node or interface identifiers, to represent the network path. Namely, an entire network path in form of a sequence of node or interface identifiers may be compressed.

It may be appreciated further that encoding schemes such as those using the header can result in very large frame headers, which can impact a treatment of the frame through the network. For example, payment of a large frame header tax would result due to increasing the frame size. This may further result in reduction of, or other issues related to, calculation of a maximum transmission unit (MTU), increased delay, delay-variation issues, and/or fragmentation requirements through a network. Additionally, the types of transport technologies that can support an expandable header to carry the path are somewhat limited, thus they may not have broad support.

It may be recognized that encoding schemes such as placing an entire network a path in a destination address, even with compression, can only provide a limited amount of path encodings and limit the applicability of the technique to small networks scopes, due to small size of the message frame and/or packet address space.

The novel techniques disclosed herein provide an alternate path encoding and/or decoding scheme adapted to encode up to very large network path space in a relatively small and/or minimal frame header information element, e.g., packet address space. The novel encoding and/or decoding techniques do not require an encoding of an ordered sequence of instructions, e.g., node or interface identifiers and/or path segments, to represent the network path and they may be implemented by network elements, including network nodes along a particular message path, without having to retain routing tables and/or network state information. Rather, in at least some embodiments, they encode a disproportionately smaller value of what may be referred to as a flat reference, such as a label or other value, such as a sequence number, and/or index, representing the unique network path, without depending upon a node length and/or complexity of an encoded network path. In at least some embodiments, the novel encoding and/or decoding scheme relies upon some or all nodes within the network segment to participate in a network discovery protocol, which would result in the ability to formulate a common topological view of the network.

According to the example embodiments, all nodes within the network are provided with and/or otherwise represented by a unique identifier value. Alternatively, or in addition, a unique identifier interfaces and/or ports may be provided for each node. In at least some embodiments, some or all nodes within the network apply and/or have access to a common network path encoding algorithm, which may be adapted to associate a flat space, such as a path index, e.g., a sequence number, to a unique network path which represents an ordered sequence of network instructions that may identify nodes, routing ports and/or connections corresponding to edges of a network graph. In at least some embodiments, several and up to all nodes within the network may support a common network path decoding algorithm, which may be derived according to an ordered sequence of network instructions from a sequence number, such as the example path index.

FIG. 1 is a block diagram illustrating an example, non-limiting embodiment of a network 100 configured for path-indexed source routing in accordance with various aspects described herein. The example network 100 includes a source node 102, a destination node 104 and a message forwarding network 106 in communication between the source node 102 and the destination node 104. According to the illustrative example, the source node 102 is configured to send information to the destination node 104 via the message forwarding network 106. The information may be in the form of messages 112, such as information packets and/or packet streams. The messages 112 may be arranged in a frame structure that includes an address or header portion 114 and a payload portion 116. The header portion 114 may include routing information that identifies one or more of a message source, a message destination, and a particular network path to be used in conveying the message 112 from the source node 102 to the destination node 104. In at least some embodiments, the destination node 104 may also serve as a source node, capable of sending messages 112 to another node, such as the source node 102. Likewise, in at least some embodiments, the source node 102 may serve as a destination node for messages 112 originating at another node, such as the destination node 104. Accordingly, the example source and destination nodes 102, 104 may be configured for bidirectional message exchange via the message forwarding network 106. It is understood that such bidirectional exchanges may use a common path for both directions of traffic, different paths for each direction of traffic, or some combination thereof.

One or both of the example source and destination nodes 102, 104 may be referred to as an edge node, e.g., signifying its connection to the example message forwarding network 106 and its ability to serve as an entry and/or exit device for accessing the example message forwarding network 106. In a context of service provider networks providing networking and/or networked services to consumers, the edge devices may be referred to as customer edge (CE) devices, e.g., CE routers. Without limitation, the example edge nodes in the form of the source and destination nodes 102, 104, may include any message processing and/or networking device, such as a router, a bridge, a switch, a multiplexer, and so on.

In particular, the example message forwarding network 106 includes five interconnected nodes 108a, 108b, 108c, 108d, 108e, generally 108. In at least some embodiments, the nodes may have an associated label or node identifier, e.g., a name or reference number. It is envisioned that in at least some embodiments, the node identifier may be assigned, e.g., by a network operator. Alternatively, or in addition, the node identifier may be based on a MAC address and/or some other unique identification (ID). According to the illustrative example, the five nodes 108 are labeled as node_1 108a, node_2, 108b, node_3 108c, node_4 108d and node_5 108e. In at least some embodiments one or more of the nodes are configured for receiving and/or forwarding messages 112 according to a particular network path. In a routing context, the network path may be referred to as a routing path. It is understood further that the nodes 108 may include one or more of a router, a switch, a bridge, a multiplexer, a repeater, and so on.

The example message forwarding network 106 represents a fully meshed 5-node network, in which each of the five nodes 108 is in communication with each of the remaining four nodes 108 via respective links, e.g., network path segments 109. There are ten (10) path segments 109 in a fully meshed 5-node network, with example reference labels (1) through (10). In at least some embodiments, the network path segments 109 may be associated with ports of the nodes 108. According to the illustrative examples, such port designations of a node 108 will correspond to the reference labels of the example network path segments 109.

It is understood that physical or transport media supporting the path segments 109 may include any transport media suitable for an exchange of information, such as the example messages 112. By way of example, and without limitation, the transport media may include one or more of tethered media, such as optical fiber, coaxial cable, twisted copper pair, untethered media, such as mobile cellular, wireless lanes, such as WiFi, BlueTooth, and the like, free-space optical, microwave, terrestrial radio, satellite communications, and so on. In some embodiments, all the nodes 108 of the message forwarding network 106 may utilize a common or like kind of transport medium, e.g., supporting all of the network path segments 109. In at least some embodiments, at least some of the nodes 108 of the message forwarding network 106 may utilize different types of transport media. Accordingly, at least some network path segments 109 may utilize one type of transport medium, while at least some other network path segments 109 may utilize another type of transport medium. It is envisioned that at least some embodiments of mixed transport media types, one or more of the nodes 108 may serve as bridges between different transport media.

Upon close inspection of the example 5-node fully meshed, message forwarding network 106, it is evident that each node may support 64 unique network paths. A complete listing of the example 5-node fully meshed, message forwarding network 106 is listed in Table 1, provided below.

TABLE 1

Unique Paths of a 5-Node, Fully Meshed Network.

| | |
|---|---|
| [1] | Nodes <1><2> -- Edges <1> |
| [2] | Nodes <1><2><3> -- Edges <1><5> |
| [3] | Nodes <1><2><3><4> -- Edges <1><5><8> |
| [4] | Nodes <1><2><3><4><5> -- Edges <1><5><8><10> |
| [5] | Nodes <1><2><3><5> -- Edges <1><5><9> |
| [6] | Nodes <1><2><3><5><4> -- Edges <1><5><9><10> |
| [7] | Nodes <1><2><4> -- Edges <1><6> |
| [8] | Nodes <1><2><4><3> -- Edges <1><6><8> |
| [9] | Nodes <1><2><4><3><5> -- Edges <1><6><8><9> |
| [10] | Nodes <1><2><4><5> -- Edges <1><6><10> |
| [11] | Nodes <1><2><4><5><3> -- Edges <1><6><10><9> |
| [12] | Nodes <1><2><5> -- Edges <1><7> |
| [13] | Nodes <1><2><5><3> -- Edges <1><7><9> |
| [14] | Nodes <1><2><5><3><4> -- Edges <1><7><9><8> |
| [15] | Nodes <1><2><5><4> -- Edges <1><7><10> |
| [16] | Nodes <1><2><5><4><3> -- Edges <1><7><10><8> |
| [17] | Nodes <1><3> -- Edges <2> |
| [18] | Nodes <1><3><2> -- Edges <2><5> |
| [19] | Nodes <1><3><2><4> -- Edges <2><5><6> |
| [20] | Nodes <1><3><2><4><5> -- Edges <2><5><6><10> |
| [21] | Nodes <1><3><2><5> -- Edges <2><5><> |
| [22] | Nodes <1><3><2><5><4> -- Edges <2><5><7><10> |
| [23] | Nodes <1><3><4> -- Edges <2><8> |
| [24] | Nodes <1><3><4><2> -- Edges <2><8><6> |
| [25] | Nodes <1><3><4><2><5> -- Edges <2><8><6><7> |
| [26] | Nodes <1><3><4><5> -- Edges <2><8><10> |
| [27] | Nodes <1><3><4><5><2> -- Edges <2><8><10><7> |
| [28] | Nodes <1><3><5> -- Edges <2><9> |
| [29] | Nodes <1><3><5><2> -- Edges <2><9><7> |
| [30] | Nodes <1><3><5><2><4> -- Edges <2><9><7><6> |
| [31] | Nodes <1><3><5><4> -- Edges <2><9><10> |
| [32] | Nodes <1><3><5><4><2> -- Edges <2><9><10><6> |
| [33] | Nodes <1><4> -- Edges <3> |
| [34] | Nodes <1><4><2> -- Edges <3><6> |
| [35] | Nodes <1><4><2><3> -- Edges <3><6><5> |
| [36] | Nodes <1><4><2><3><5> -- Edges <3><6><5><9> |
| [37] | Nodes <1><4><2><5> -- Edges <3><6><7> |
| [38] | Nodes <1><4><2><5><3> -- Edges <3><6><7><9> |
| [39] | Nodes <1><4><3> -- Edges <3><8> |
| [40] | Nodes <1><4><3><2> -- Edges <3><8><5> |
| [41] | Nodes <1><4><3><2><5> -- Edges <3><8><5><7> |
| [42] | Nodes <1><4><3><5> -- Edges <3><8><9> |
| [43] | Nodes <1><4><3><5><2> -- Edges <3><8><9><7> |
| [44] | Nodes <1><4><5> -- Edges <3><10> |
| [45] | Nodes <1><4><5><2> -- Edges <3><10><7> |
| [46] | Nodes <1><4><5><2><3> -- Edges <3><10><7><5> |
| [47] | Nodes <1><4><5><3> -- Edges <3><10><9> |
| [48] | Nodes <1><4><5><3><2> -- Edges <3><10><9><5> |
| [49] | Nodes <1><5> -- Edges <4> |
| [50] | Nodes <1><5><2> -- Edges <4><7> |

TABLE 1-continued

Unique Paths of a 5-Node, Fully Meshed Network.

| [51] | Nodes <1><5><2><3> -- Edges <4><7><5> |
| [52] | Nodes <1><5><2><3><4> -- Edges <4><7><5><8> |
| [53] | Nodes <1><5><2><4> -- Edges <4><7><6> |
| [54] | Nodes <1><5><2><4><3> -- Edges <4><7><6><8> |
| [55] | Nodes <1><5><3> -- Edges <4><9> |
| [56] | Nodes <1><5><3><2> -- Edges <4><9><5> |
| [57] | Nodes <1><5><3><2><4> -- Edges <4><9><5><6> |
| [58] | Nodes <1><5><3><4> -- Edges <4><9><8> |
| [59] | Nodes <1><5><3><4><2> -- Edges <4><9><8><6> |
| [50] | Nodes <1><5><4> -- Edges <4><10> |
| [61] | Nodes <1><5><4><2> -- Edges <4><10><6> |
| [62] | Nodes <1><5><4><2><3> -- Edges <4><10><6><5> |
| [63] | Nodes <1><5><4><3> -- Edges <4><10><8> |
| [64] | Nodes <1><5><4><3><2> -- Edges <4><10><8><5> |

According to the two columns of entries of Table 1, each row includes a unique path reference or path index value between brackets, followed by an ordered sequence of nodes, then followed by an ordered sequence of path segments or edges adjoining pairs of nodes. The ordered sequence of nodes and/or the ordered sequence of edges of a given path index represents a particular and unique path between the end nodes of the sequence of nodes. It is understood that a path index may be used to identify a corresponding unique path according to the example mapping of path indexes to paths provided in Table 1. Thus, Table 1 provides a particular mapping that may be used to encode a particular network path according to its corresponding path index value.

In at least some embodiments, the path index value of a particular network path may be included within a message 112, e.g., inserted into the message 112 by a source node 102 according to a source routing paradigm. Each of the nodes 108 of the example message forwarding network 106 may obtain a description of a topology of the message forwarding network 106, e.g., according to a network discovery process. In at least some instances, the network topology may include identification of the nodes 108 and/or the edges or path segments 109 between pairs of nodes according to the particular configuration of the message forwarding network.

To the extent any node 108, e.g., node 108a, in the message forwarding network 106 receives a message 112 encoded with a path index, the node 108a may decode and/or otherwise obtain a decoding of the path index to identify a particular network path and/or network instructions of the particular path, associated with the path index. Having identified the particular network path assigned by the source node 102, the node 108a of the message forwarding network 106 may identify a next or subsequent node 108, e.g., node 108b, along the network path and, in at least some embodiments, identify an associated port or path segment 109, e.g., path segment (1) through which the message 112 may be forwarded towards the identified next node 108b. The example path index-based source routing process may continue in a similar manner, progressively advancing along the particular path until a terminal or final node of the particular network path has been reached. A terminal or final node of the packet forwarding network 106, e.g., node_5 108e, may discover and/or otherwise identify itself as the terminal or final node, according to its node reference value being the last node in the list of nodes of the particular network path. In at least some embodiments, the terminal node 108e may perform additional operations, such as providing the message and/or content thereof to a destination node 104 and/or some other data processing device.

It is envisioned that in at least some embodiments, a path mapping or encoding may be used to generate the path index to particular path associations, such as those provided in Table 1, such that a decoding is exists that yields the particular path for each path index. The encoding and/or decoding may be based on algorithms and/or descriptions of corresponding network topologies.

Figure 2:
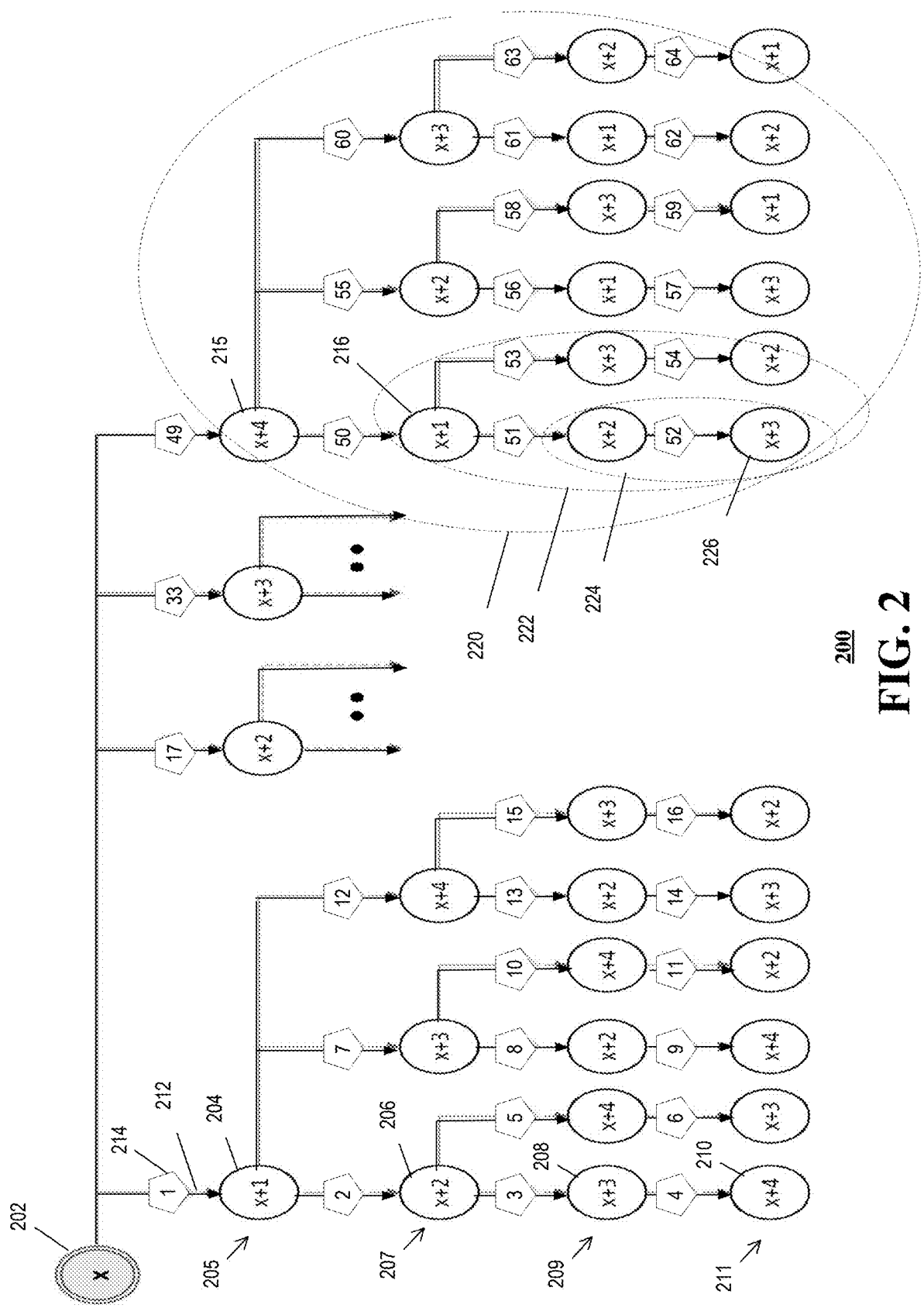
FIG. 2 is a block diagram illustrating an example, non-limiting embodiment of a generalized path indexed encoding graph in accordance with various aspects described herein.

FIG. 2 is a block diagram illustrating an example, non-limiting embodiment of a generalized path-indexed encoding graph 200 in accordance with various aspects described herein. The path-indexed encoding graph 200 includes an arrangement of circles or ovals interconnected by arrows. The example graph 200 illustrates all possible unique paths through one node of a five-node meshed network, such as the example message forwarding network 106 (FIG. 1). The circles or ovals correspond to nodes 108 of a meshed network (FIG. 1), but do not represent the actual nodes. Rather, the circles or ovals represent a reference node along a particular path. The node reference values are identified in variable form with respect to the value "x," which corresponds to a source node of a particular network path.

The example graph 200 includes a source node reference 202. The source node reference 202 includes the value "x", which may correspond to a label or other suitable reference of a source node of a path through a five-node mesh network having 320 unique paths, with each node capable of sourcing 64 unique paths of the 320 total unique paths as represented by the example graph 200. Accordingly, the value of "x" may be obtained for one of the five nodes, which may be arranged in an orderly manner, e.g., according to their labels 1 through 5. The 64 unique paths sourced through node x may be repeated for each of the other five nodes. Thus, for an initial pass, the value of x may take on the value of 1 corresponding to a first node, then upon a second pass, the value of x may take on the value of 2 corresponding to a second node and so on for the remaining nodes. It is worth noting here that the results of the node references may be calculated in a modulo fashion, e.g., modulo n, or modulo 5 here as the number of nodes n=5, such that for node 3, the node reference value of 3+4=7 would be 2 under a modulo 5 operation. It is understood that reference to a five-node meshed network is by way of example and the novel techniques disclosed herein may be applied to other meshed networks having greater or fewer numbers of nodes, with the appropriate adjustments taken into account for the different numbers of nodes.

According to the example graph 200, the first node reference value 204 includes the value "x+1", which corresponds to a next node in an ordered sequence of the five nodes of the example message forwarding network 106, the sequence starting with the source node. A second, node reference value 206 includes the value "x+2", which corresponds to a next, next node in the ordered sequence of the five nodes of the example message forwarding network 106. A third node reference value 208 includes the value "x+3", which corresponds to a next, next, next node, and a fourth node reference value 210 includes the value "x+4", which corresponds to a next, next, next, next node, all references to the nodes appearing in an ordered sequence of the five nodes of the example message forwarding network 106. The ordered sequence referenced in relation to the x, x+1, etc., values correspond to an ordered sequence of nodes, e.g., 1 through 5, and not the ordered sequence of nodes of a particular path through the message forwarding network 106.

According to the example graph 200, each of the node references 204, 206, 208, 210 is joined to one or two other node reference 204, 206, 208, 210 by one or two arrows 212, the arrow 212 indicating that nodes corresponding to the node references are adjacent nodes along a particular network path. A direction of the arrow suggests a directionality of the path, which may correspond to a direction of message forwarding along the path, i.e., from a source node to a destination node. Each of the arrows 212, in turn, includes a pentagonal label 214, which includes a respective path index $P_{idx}$ value.

By way of example and starting from the source node reference 202, a first path segment 214 having $P_{idx}=1$ corresponds to a unique path from node x to node x+1, e.g., from node 1, to node 2, which may be represented by the path {<n1> <n2>}. Likewise, a second path segment 214 having $P_{idx}=2$ corresponds to a unique path from node x to node x+1, then to node x+2, e.g., from node 1, to node 2, to node 3, which may be represented by the path {<n1> <n2> <n3>}. A third path segment 214 having $P_{idx}=3$ corresponds to a unique path from node x to node x+1, then to node x+2, then to node x+3, e.g., from node 1, to node 2, to node 3, to node 4 which may be represented by the path {<n1> <n2> <n3> <n4>}. A fourth path segment 214 having $P_{idx}=4$ corresponds to a unique path from node x to node x+1, then to node x+2, then to node x+3, then to node x+4, e.g., from node 1, to node 2, to node 3, to node 4, to node 5 which may be represented by the path {<n1> <n2> <n3> <n4> <n5>}. The example graph 200 may be evaluated in a like manner for any of the other path segments and node reference values to obtain corresponding unique paths. The entire process of one value of "x" may then be repeated for other values of x to build a listing of all available unique paths, e.g., 320 for the example five-node message forwarding network.

The particular arrangement of node references 204, 206, 208 and $P_{idx}$ values, which are identified in the pentagonal labels 214 of the interconnecting arrows 212, result in a particular encoding that yields unique $P_{idx}$ for the unique paths of a modeled meshed network. The particular arrangement of these items in the example graph 200 may be referred to as an "ordered walk," e.g., a prioritized node walk, of all of the available unique paths through the nodes accessible from the source node reference 202, which represents one example of a path encoding algorithm logic. The encoding of an order sequence of network instructions (e.g., nodes/interfaces) to a flat sequence number (i.e., path index or $P_{idx}$) can be represented using an algorithm that essentially uses a type of priority ordered node walk, as discussed above.

According to the example priority ordered node walk of the five-node meshed network, the reference node x is connected to four other nodes: x+1, x+2, x+3 and x+4, according to a first-tier paths 205 containing two nodes. Each of the nodes of the first-tier paths 205 is connected to the remaining nodes, not including those nodes already in the path, according to second-tier paths 207 containing three nodes. Similarly, each of the nodes of the second-tier paths 207 is connected to the remaining nodes, not including those nodes already in the paths above, according to third-tier paths 209 containing four nodes. And finally, each of the nodes of the third-tier paths 209 is connected to the remaining node, not including those nodes already in the paths above, according to fourth-tier paths 211 containing five nodes.

The priority ordered walk may be configured to sequentially "walk" all nodes of each of the first-tier paths 205, followed by each of the second-tier paths 207, followed by each of the third-tier paths 209 and followed by each of the fourth-tier paths 211 for a first node reference 204 of the first-tier 205 paths. This node walk process may be repeated sequentially for each of the other second, third and fourth node references of the first-tier paths to complete the example 64 unique paths sourced by source node reference 202. A path identity, list or vector may be constructed by adding an entry node to the path vector as each subgroup is further evaluated.

Under each of the first-tier nodes, the example node walk process may be repeated for higher tiers of nodes, e.g., second, third and fourth tiers 207, 209, 211. An example, all-encompassing node walk for the fourth node reference 215 includes all of the example $P_{idx}$ values contained within a first dashed boundary 220. An example higher-tier node walk may be repeated at higher levels, e.g., walking all nodes of each of the second-tier paths 207, third-tier paths 209 and fourth-tier paths 211 for a first node reference 216 of a second-tier path 207. At each tier, the process may be repeated for any higher tier until an ultimate tier, e.g., the fourth tier 211 of the example graph 200 second and third dashed boundaries 222, 224 include $P_{idx}$ values associated with the example higher-tiered node walks.

It may be appreciated that having a path index value $P_{idx}$, a decoder may identify immediately which node according to a node reference of the first tier 205, each first-tier node being associated with a contiguous set of path index value $P_{idx}$. Likewise, the decoder may identify immediately which next node according to a next node reference of the second tier 207, each second-tier node being associated with a contiguous set of path index value $P_{idx}$, and so on. Thus, a decoder may obtain nodes of a unique path according to a path index value $P_{idx}$, an understanding of the network, e.g., nodes and ports or edges, and an algorithm that corresponds to an encoding algorithm, such as the example priority node walk.

Figure 3:
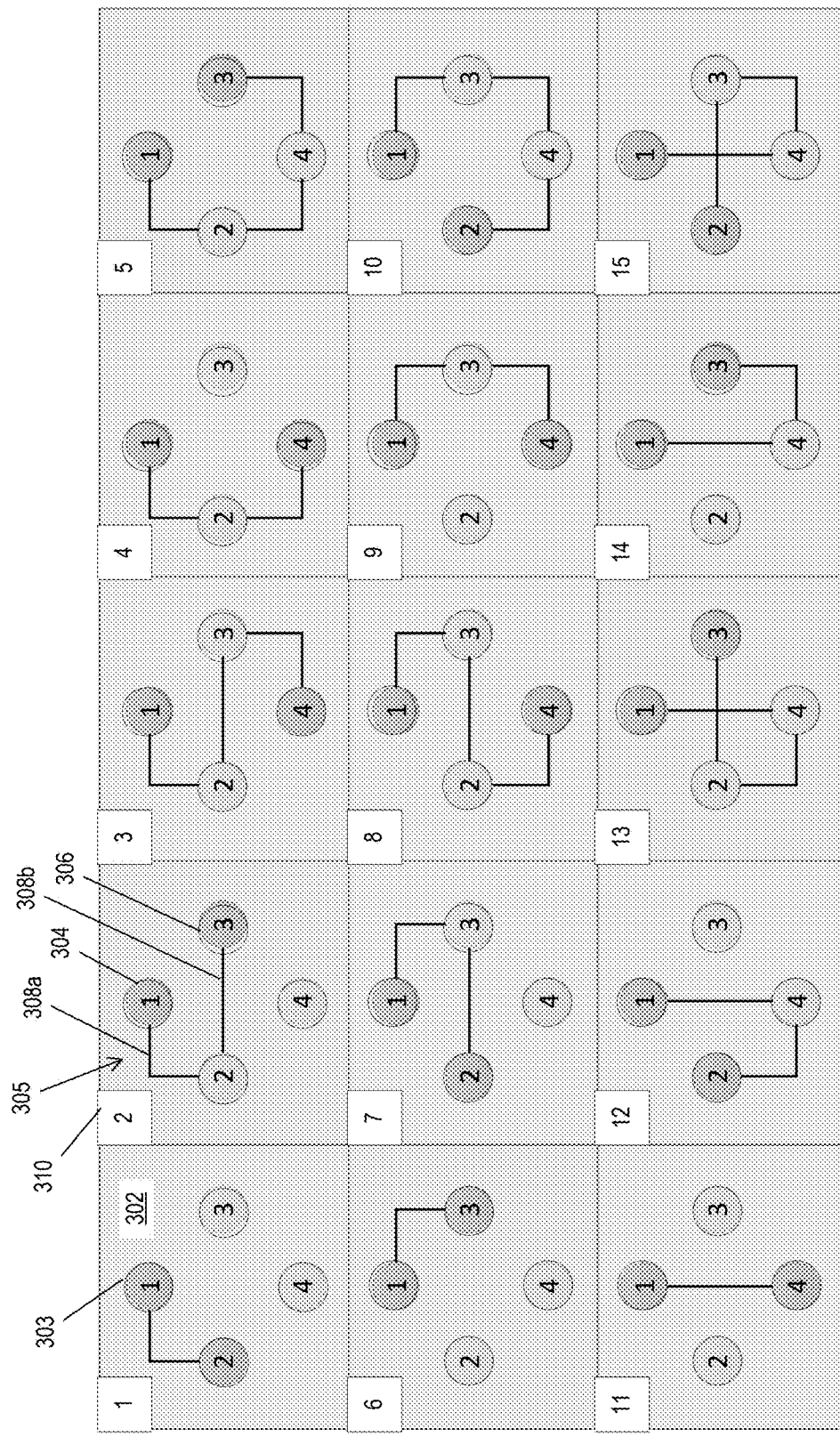
FIG. 3 is a block diagram illustrating an example, non-limiting embodiment of a four-node mesh network configured according to a path indexed encoding scheme in accordance with various aspects described herein.

FIG. 3 is a block diagram illustrating an example, non-limiting embodiment of a priority node walk 300 for a four-node mesh network 302 configured according to a path indexed encoding scheme in accordance with various aspects described herein. The four-node mesh network 302 includes four nodes 303, labeled as 1, 2, 3 and 4. It is understood that a four-node fully meshed network supports 60 unique paths, with each node capable of sourcing 15 unique paths of the total 60 unique paths. The example priority node walk 300 is sourced from node_1, with all paths originating from node_1. The 15 unique paths are further identified by respective $P_{idx}$ values 310 ranging from 1 through 15. Each path 305 includes a source node 304, a destination node 306 and a sequence of one or more interconnecting path segments 308a, 308b, depending upon the particular unique path and the number of different nodes of the path, i.e., two through four nodes of one to three paths.

Figures 4A, 4B:
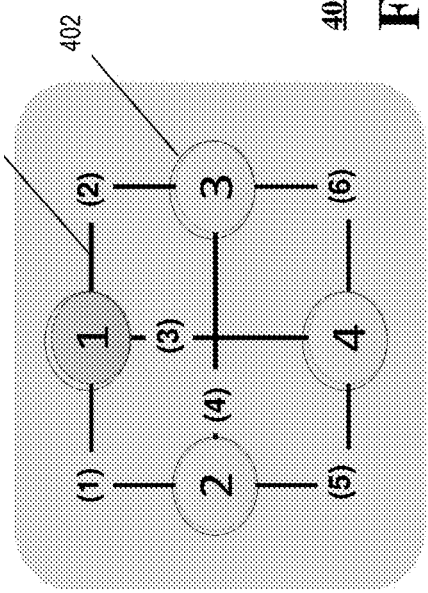
FIG. 4A is a block diagram illustrating an example, non-limiting embodiment of a four-node mesh network configured for path indexed source routing in accordance with various aspects described herein.
FIG. 4B is a block diagram illustrating an example, non-limiting embodiment of a map corresponding to an application of a four-node path indexed encoding scheme on the example four-node mesh network of FIG. 4A and in accordance with various aspects described herein.

FIG. 4A is a block diagram illustrating an example, non-limiting embodiment of a four-node mesh network 400 configured for path indexed source routing in accordance with various aspects described herein. The example four-node mesh network 400 includes four nodes 402 labeled 1, 2, 3 and 4, joined by six edges 404, labeled (1) through (6), as indicated in the illustration to obtain a fully meshed network.

FIG. 4B is a block diagram illustrating an example, non-limiting embodiment of a map 450 corresponding to an application of a four-node path indexed encoding scheme on the example four-node mesh network of FIG. 4A and in accordance with various aspects described herein. According to a left portion of the example map 450, a first column includes reference a path index 452 ranging from 1-15, also represented in binary format as 0000 through 1111. A second column includes sequences of edges 454, starting with a left-most edge, and progressing according to the interconnecting arrows to obtain a sequence of edges associated with each of the corresponding path indexes 452. A third column includes corresponding sequences of nodes 456 interconnected by the corresponding sequences of edges 454 and associated with the corresponding path indexes 452.

The example includes 15 path indexes 452 corresponding to all possible unique paths of the four-node mesh network 400 (FIG. 4A) sourced from the first node 402, i.e., node 1. It is understood that the example map may be extended to represent all possible unique paths from one or more of the other nodes 402 of the four-node mesh network 400, e.g., up to 60 unique paths.

A right portion of the example map 450 includes example forwarding entries 460 associated with the example path indexes 452. By way of example, the forwarding entries include a first value corresponding to a source node of the respective path, e.g., node 1 of the illustrative example, followed by a MAC address, e.g., a destination MAC address including an organizationally unique identifier (OUI) and the last three octets encoded to include a binary representation of the path index 452 in the first column of the left portion of the example map 450. The example map 450 also includes a device edge/port mapping 462 associated with each of the respective path indexes 452.

Figure 5:
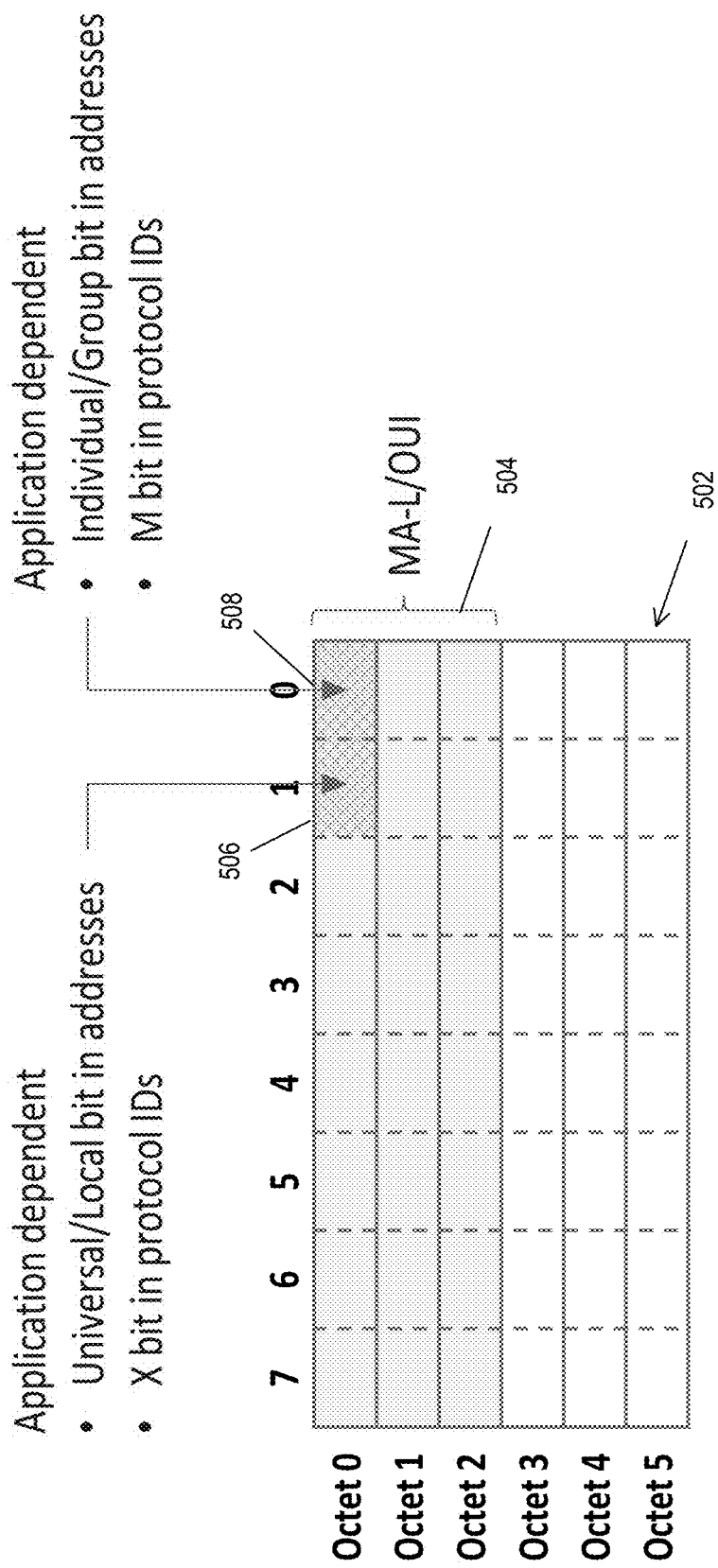
FIG. 5 is a block diagram illustrating an example, non-limiting embodiment of MAC address adapted for path-indexed source routing.

FIG. 5 is a block diagram illustrating an example, non-limiting embodiment of MAC address 500 adapted for path-indexed source routing. The MAC Address. As defined by IEEE 802 Std, " . . . the term MAC address is used to refer to a 48-bit or 64-bit number that is used to identify the source and destination MAC entities. A MAC address may also be used to identify a MAC SAP. In many IEEE 802 standards, the term MAC address refers only to a 48-bit MAC address."

According to the example EUI-48 format, the MAC address provides six octets 502, or eight-bit portions, labeled as octet 0 through octet 5. The first three octets, i.e., octet 0 through octet 2, may be reserved for a MA-L/OUI 504. A first bit 508, i.e., bit 0, of octet 0 may be reserved for an application dependent quantity, such as an individual/group bit in addresses and/or an M bit in protocol identifiers (IDs). Similarly, a second bit 506, i.e., bit 1 of octet 0 may be reserved for another application dependent quantity, such as a universal or local bit in addresses and/or an X bit in protocol IDs.

An OUI portion of the MAC address includes three octets, i.e., octet 0 through octet 2, which includes 24 bits of information. Accordingly, the OUI portion of the MAC address is capable of representing $2^{24}$, or about 16.7 million unique path index $P_{idx}$ values, e.g., representing a logarithmic relationship between the path index size and the available number of unique network paths that may be identified by the path index.

Figure 6:
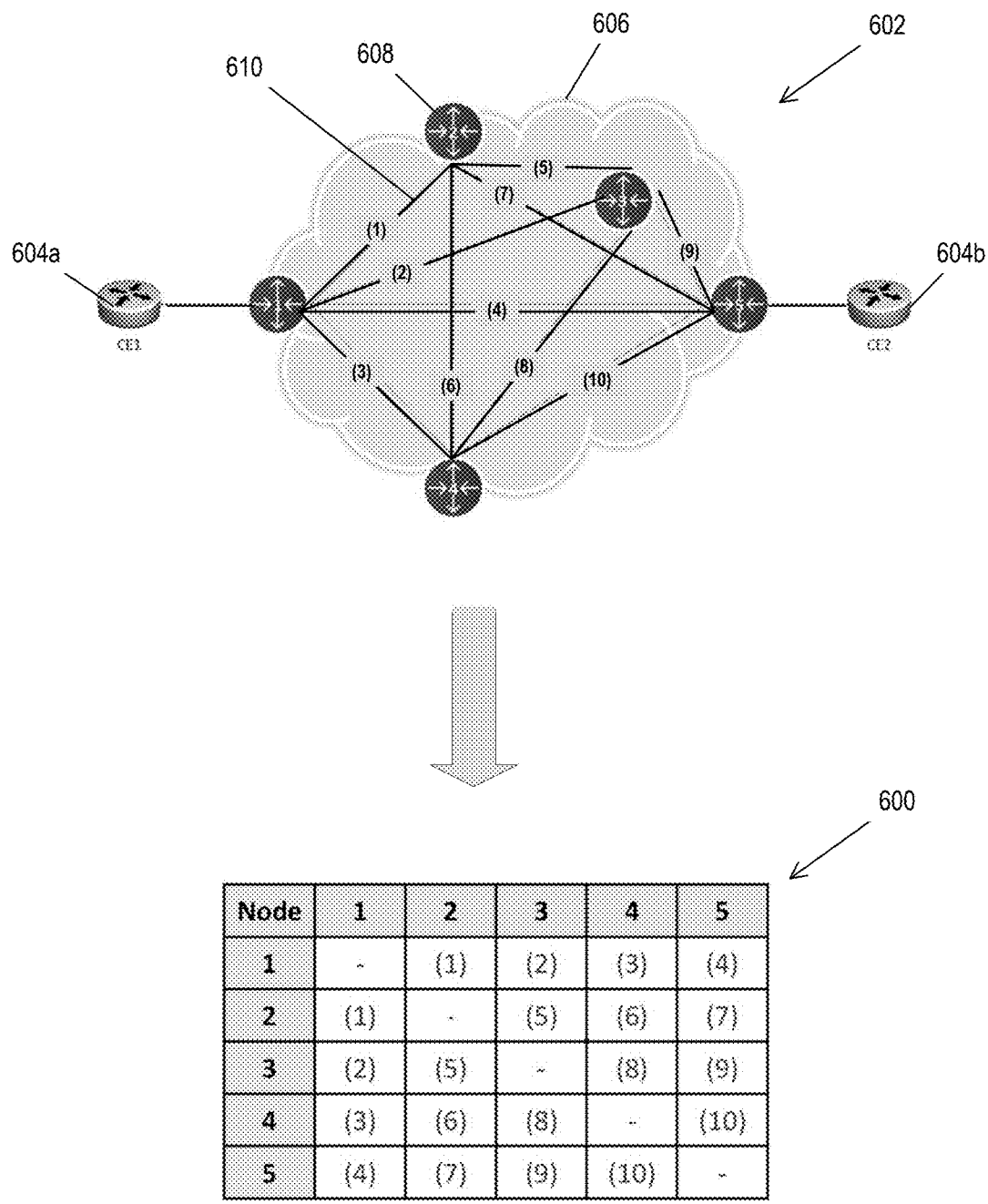
FIG. 6 is a block diagram illustrating an example, non-limiting embodiment of a network discovery table adapted for path-indexed source routing in accordance with various aspects described herein.

FIG. 6 is a block diagram illustrating an example, non-limiting embodiment of a network discovery record adapted for path-indexed source routing in accordance with various aspects described herein. The example network discovery record is provided in the format of a two-dimensional network topology table 600. The table corresponds to a network graph 602, which identifies all nodes of a network or portion of a network under consideration. The example graph 602 includes edge devices 604*a*, 604*b* in communication with a meshed network 606. The meshed network 606 includes nodes 608 interconnected by edges 610.

The example table 600 captures a topology of the meshed network 606 by including a list of node reference values for all the nodes 608 of the meshed network 606 along a top row and a list of the same node reference values along a lefthand column. The remaining interior entries of the table 600 include nodal connection or edge reference values corresponding edges 610 extending between the corresponding particular pairs of nodes 608 according to the table 600. The node reference values may include any suitable reference capable of uniquely identifying a node 608, such as assigned logical reference values, device IDs of the nodes 608, MAC addresses of the nodes 608, and the like. Likewise, the edge reference values may include any suitable reference capable of uniquely identifying edges 610, such as assigned logical values, port reference indicators, and the like.

In at least some embodiments, the network discovery record may take the form of a table, such as the example table 600. Alternatively, or in addition, the network discovery record may take any other suitable form for storing, accessing and/or interpreting information contained within the network discover record. Examples include, without limitation, database records, arrays, matrices, tables, lists, and so on.

In at least some embodiments, a network discovery process is implemented to facilitate discovery of and/or update to a network topology. It is envisioned that a network may undergo changes from time to time as may be necessary and/or beneficial for network resource management, traffic management, fault recovery, operation and maintenance actions and so on. In view of such adaptations of a network, it is anticipated that the network discovery process may be performed from time to time as may be necessary to maintain a reliable representation of the network, such as the representation provided in the example table 600.

It is also understood that in at least some embodiments, each node 608 of the meshed network 606 may retain and/or otherwise have access to the network topology record. For example, in at least some embodiments, each node 608 may have local storage to retain a network topology record, which may include a record of a complete network topology of the meshed network 606. Alternatively, or in addition, at least some nodes 608 may obtain the network topology record from a separate location, such as another node 608 and/or some other storage location, such as a centralized network database and/or service provider. A discovery process may include a sharing of network topology records between nodes 608 and/or between some centralized network topology repository and one or more of the nodes 608. Accordingly, at least one node 608 may discover a network topology as may have been changed, updated and/or otherwise modified. The discovering node 608 may then forward an updated network topology record and/or portion thereof to one or more other nodes 608 and/or other centralized network topology repository for access by and/or dissemination to the remaining nodes 608 such that all nodes 608 of the meshed network 606 have and/or have access to a current and accurate representation of the network topology.

The following discussion provides insight into a number and/or size of network paths available to network employing the novel techniques disclosed herein, such as a fully meshed network. By way of example, let n represent a number of nodes within a network, which may include a fully meshed network in which each node is connected to and/or otherwise accessible by every other node in the network. Let the value NE represent a number of edges, or connections between adjacent nodes. A value of NE may be determined according to the total number of nodes n according to Eq. A, provided below. The function "C" in the equation determines all combinations of nodes n taken two at a time.

$$NE_n = C\binom{n}{2} = \frac{n!}{(n-2)! \times 2!} = \frac{n(n-1)}{2} \quad \text{(Eq. A)}$$

Let the value E represent a total number of edges or connections between any given node and all adjacent nodes within an n-node network. A value of E may be determined according to Eq. B, provided below.

$$E_n = (n-1) \quad \text{(Eq. B)}$$

Let the value P represent a number of unique paths through an n-node network that can originate from any given node of the network. It is worth restating here that in at least some embodiments, the network path may be identified by a unique sequence of edges. Accordingly, the value P may be determined according to Eq. C, provided below, in which $E_1$ represents the number of edges for single node paths (n–(n–1)), $E_2$ represents the number of edges for two-node paths (n–(n–2)), and so on. The function "P" determines all permutations of n items taken i items at a time.

$$P_n = E_n(1 + E_{n-1}(1 + E_{n-2}(1 + \ldots E_2(1 + E_1)))) = \quad \text{(Eq. C)}$$
$$\frac{1}{n}\sum_{i=2}^{n} P\binom{n}{i} = \sum_{i=2}^{n} \frac{(n-1)!}{(n-i)!}$$

Having determined all paths originating from any given node implies that a total number of unique paths $NP_n$ through an n-node network may be determined according to Eq. D, provided below.

$$NP_n = n \times P_n = \sum_{i=2}^{n} \frac{n!}{(n-i)!} \quad \text{(Eq. D)}$$

In view of the foregoing equations, it is evident that a maximum number of unique paths $NP_n$ for even a relatively small network can be quite large as demonstrated in Table 2.

TABLE 2

Maximum Number of Unique Paths.

| Nodes | Edges (Node) | (Network) Edges | Network Paths (via Formula [D]) |
|---|---|---|---|
| 2 | 1 | 1 | 2 |
| 3 | 2 | 3 | 12 |
| 4 | 3 | 6 | 60 |
| 5 | 4 | 10 | 320 |
| 6 | 5 | 15 | 1,950 |
| 7 | 6 | 21 | 13,692 |
| 8 | 7 | 28 | 109,592 |
| 9 | 8 | 36 | 986,400 |
| 10 | 9 | 45 | 9,864,090 |
| 11 | 10 | 55 | 108,505,100 |
| 12 | 11 | 66 | 1,302,061,332 |
| 13 | 12 | 78 | 16,926,797,472 |
| 14 | 13 | 91 | 236,975,164,790 |
| 15 | 14 | 105 | 3,554,627,472,060 |
| 16 | 15 | 120 | 56,874,039,553,200 |
| 17 | 16 | 136 | 966,858,672,404,672 |
| 18 | 17 | 153 | 17,403,456,103,284,400 |
| 19 | 18 | 171 | 330,665,665,962,404,000 |
| 20 | 19 | 190 | 6,613,313,319,248,080,000 |
| 21 | 20 | 210 | 138,879,579,704,210,000,000 |
| 22 | 21 | 231 | 3,055,350,753,492,610,000,000 |
| 23 | 22 | 253 | 70,273,067,330,330,100,000,000 |
| 24 | 23 | 276 | 1,686,553,615,927,920,000,000,000 |
| 25 | 24 | 300 | 42,163,840,398,198,100,000,000,000 |
| 26 | 25 | 325 | 1,096,259,850,353,150,000,000,000,000 |
| 27 | 26 | 351 | 29,599,015,959,535,000,000,000,000,000 |
| 28 | 27 | 378 | 828,772,446,866,981,000,000,000,000,000 |
| 29 | 28 | 406 | 24,034,400,959,142,500,000,000,000,000,000 |
| 30 | 29 | 435 | 721,032,028,774,274,000,000,000,000,000,000 |
| 31 | 30 | 465 | 22,351,992,892,002,500,000,000,000,000,000,000 |
| 32 | 31 | 496 | 715,263,772,544,079,000,000,000,000,000,000,000 |

In at least some embodiments one or more algorithms may be utilized to encode unique network paths of a meshed network in part or in their entireties. Such encoding may reduce a size requirement to alleviate, reduce, optimize and/or otherwise avoid excessive usage of frame resources in source routing techniques. At least some of the encoding techniques allow network paths to be represented by a value, such as a numeric value or index having a size, e.g., byte requirement for representing the index, which is independent from network path size, e.g., an ordered listing of nodal references of nodes along the corresponding size.

It is envisioned that in at least some embodiments, an encoded path value, such as the example path index $P_{idx}$ may be included within a message, e.g., by a source and/or ingress node of the network. In at least some embodiments, space can be found in a frame and/or packet header to carry the $P_{idx}$. This space would generally be limited and/or restricted to some maximum size, e.g., b bits. Accordingly, a size of the network, i.e., the number of nodes n within the network, which can be supported may be determined according to Eq. J, provided below.

$$NP_n \leq 2^b \Rightarrow \sum_{i=2}^{n} \frac{n!}{(n-i)!} \leq 2^b \Rightarrow \log_2\left(\sum_{i=2}^{n} \frac{n!}{(n-i)!}\right) \leq b \quad \text{(Eq. J)}$$

By way of nonlimiting example, using extreme worse case scenarios, if a size of the path index $P_{idx}$ space, i.e., b bits is 24 bits, or equivalently 3 Bytes, then the illustrative encoding/decoding scheme may support a fully meshed network of an example 10 nodes. A 10-node, fully meshed network in which every node is both a provider device and/or a provider edge device, there are 9,864,090 or approximately ~9.8×10⁶ unique network paths. Accordingly, a 3 Byte $P_{idx}$ may accommodate a maximum of up to 9.8×10⁶ unique network paths. If the size of the path index $P_{idx}$ space "b" is increased to 96 bits, or equivalently, a mere 12 Bytes, then the example encoding/decoding scheme may support a fully meshed network of up to 27 nodes in which every node is both a provider device and/or a provider edge device. A 27-node fully meshed network in which every node is both a provider device and/or a provider edge device provides an astonishing 29,599,015,959,535,000,000,000, 000,000 or approximately ~29.6×10²⁷ unique paths.

In at least some embodiments, encoded networks paths, as may be represented by an encoded value, such as a path index $P_{idx}$, may be decoded according to a decoding methodology to obtain the corresponding unique network path. In at least some embodiments, a decoding methodology requires a decoding device to have a network topology view. For embodiments in which multiple devices, such as all devices within a network segment associated with the particular unique path decode the encoded values, these nodes should have a common network topology view, such as the example network topology table 600 (FIG. 6).

According to the example decoding process, it is assumed that all devices within the network may be uniquely identified by a device, e.g., a node, identifier. In at least some embodiments, the device identifiers may include at least a portion of a MAC address. More generally, the device identifier may be any value, e.g., obtained from a flat space and/or range, which may be assigned by a management system.

Likewise, according to the example decoding process, it is assumed that all network paths, path segments, links and/or connections between devices within the network segment may be uniquely identified by an edge identifier. In general, an edge or connection corresponds to a point-to-point entity providing connectivity between a pair of adjacent devices. Without limitation, a connection may be a link, a logical port and/or interface, and/or a sub-network, e.g., an underlay.

According to the example decoding process, a source device of a message, e.g., a frame or packet being transmitted or otherwise transported over a desired path may be encoded within the message. Generally, a path may be represented by a sequence of network devices, communication devices, or nodes between a source device, e.g., a first provider edge device, and destination device, e.g., a second provider edge device. In at least some embodiments, a path represents a sequence of connections starting from a source device to a destination device.

In at least some embodiments, a message, e.g., a frame or packet transmitted by the source device, includes and/or otherwise encodes a source device identifier, a path identifier or both identifiers into the message, e.g., into header information of the frame. In at least some embodiments, intermediate devices may examine the header information of the message to determine how to forward and/or bridge the message to the next neighboring device along the particular unique path.

For a given path index $P_{idx}$, the forwarding decision may be derived by at least one node, such as any given node along the unique path encoded by the path index $P_{idx}$. In at least some embodiments, every node along the unique path may be configured to derive a next node along the path from the $P_{idx}$ value. By way of example, a range $R_1$ of $P_{idx}$ that may be sourced from a given node may be provided by Eq. E, provided below.

$$R_1 = \frac{NP_n}{n}, \text{ where } R_i \in \mathbb{Z} \tag{Eq. E}$$

The foregoing equation implies that a given node $n_i$ is within a range determined according to Eq. F, provided below.

$$n_i = \{(i-1)R_1+1) \ldots (iR_1)\} \tag{Eq. F}$$

The source $n_1$ of the packet may be determined according to Eq. G, provided below.

$$n_1 = \frac{P_{idx}}{R_1} + 1, \text{ where } n_i \in \mathbb{Z} \tag{Eq. G}$$

A normalized path index $P'_{idx}$, e.g., occurring within a range of $P_{idx}$ sourced from a given node, may be determined by Eq. H, provided below.

$$P'_{idx} = P_{idx} - (n_i - 1)R_1 \tag{Eq. H}$$

In at least some embodiments, a next node $n_k$ along a path may be determined by Eq. I, provided below.

$$\forall k \in \{2 \ldots n\}, R_k = \begin{cases} k=2, & \frac{R_{k-1}}{n-(k-1)} \\ k>2, & \frac{R_{k-1}-1}{n-(k-1)} \end{cases} \tag{Eq. I}$$

$$\text{where}\begin{cases} \exists j \\ \left|P'_{idx} \in \begin{cases} k=2, \{((j-1)R_k + R_{k-1} \cdot \text{lower}) \ldots (R_k \cdot \text{lower} + R_k - 1)\} \\ k>2, \{((j-1)R_k + R_{k-1} \cdot \text{lower} + 1) \ldots (R_k \cdot \text{lower} + R_k - 1)\} \end{cases}\right. \\ \Rightarrow n_k = f(j) \end{cases}$$

It is envisioned that in at least some embodiments, some or all of the nodes of a fully meshed network may be to perform a decoding process, such as the example decoding processes disclosed herein. In such instances, each node along a given path may obtain a complete and accurate record of a topology of the fully meshed network and, in response to receiving a network message encoded with a path index $P_{idx}$, decode the path index to obtain an identity of a next node along the path. Having determined the next node, the current node forwards the message, and the process is repeated at each node along the path until the message ultimately reaches its destination. Beneficially, messages may utilize source routing techniques in which a preferred network path is encoded into each message. This alleviates any requirement of the network nodes to develop, maintain and/or otherwise retain routing information, such as routing tables. Additionally, by encoding the network paths to an encoded, e.g., flat, value, the message space accommodating the source routing information is relatively small and quite substantially less than would otherwise be required for other traditional source routing alternatives.

FIGS. 7A through 7D are block diagrams illustrating an example, non-limiting embodiment of progressive forwarding of a path-indexed source message by a five-node, layer 2 (L2) source routing (SR), network in accordance with various aspects described herein. In at least some embodiments, this technique may be applied within a Local and Metropolitan Area Network, which may be using bridges to provide a source routing paradigm. By way of example, and in reference to FIG. 7A, the network 700 may be referred to as a L2SR (Layer 2 or L2 Source Routing) network. The path index $P_{idx}$ may be encoded in a message frame, e.g., within a MAC destination address. Each device or node within the L2SR network knows a topology of the network, which may be discovered by any network discovery protocol.

The L2SR devices or nodes may forward L2SR traffic, by one of the following example options. First, a control plane process on the L2SR device may use the discovered network information to identify all network paths intersecting a node and insert a managed, e.g., a static VLAN/MAC entry and port map association entries. This approach may result in a relatively large number of managed/static entries. For example, a node may store and/or otherwise access a network path table, such as the example provided in Table 1. Alternatively, or in addition, each device or node in the L2SR network may decode the path index provided in the message, e.g., by a MAC DA of the received frame, and forward the frame out a specified port as may be determined from an identity of the next node and knowledge of the network topology. In at least some embodiments, this approach may require the node, e.g., the L2SR device, to perform a computation, e.g., to decode the path, in real-time and at line rate. Beneficially, such a calculation intensive approach would not require any additional pre-configured forwarding entries.

According to the illustrative example, a five-node L2SR network 700 is a fully meshed network that provides transport in support of services between a first edge device 702, CE1, and a second edge device 710, CE2. By application of Eq. A, it may be determined that the example five-node, L2SR network 700 has ten (10) edges. By application of Eq. C, it may be determined that the example five-node L2SR network 700 provides 64 unique network paths from any given source L2SR device, or node. Further, by application of Eq. D, it may be determined that the example five-node L2SR network 700 provides 320 unique network paths.

Through a network discovery protocol, each device within the L2SR network has a common network topological view. In at least some embodiments, the topological view identifies all of the nodes ordered according to some value, such as the node identifier. The topological view may also include port and/or connection information identifying connections between all pairs of nodes of the network 700 according to a connection identifier, such as a port and/or link number. The example connections range from (1) to (10), while the node values range from <n1> to <n5>.

According to the illustrative example it is assumed there is a designated OUI (e.g., AB-CD-EF) that is used by the devices within the L2SR network 700 to encode the desired path through the network. Consequently, in a EUI-48 MAC address format, there can be up to 224 (~16.7 M) unique path identifiers encoded. NOTE: There is also a VLAN (with a 12-bit VLAN identifier) that may be used to further refine.

According to the illustrative example, a first node 708a wants to send packets of a particular packet stream to a fifth node 708d via a particular path 704d, from the first node 708a to a second node 708b to a fourth node 708c and to the fifth node 708d, which may be represented by N1→N2→N4→N5, or simply {<1> <2> <4> <5>}. This particular path may be identified according to an encoding scheme. For example, Table 1 provided tabulated results of an example encoding scheme for a 5-node, fully meshed network. Inspection of the tabulated results yields a match corresponding to path index 10, i.e., $P_{idx}$=10. This process of encoding a network path to a path index $P_{idx}$, may be referred to as a flattening process, e.g., encoding a particular network path of an exceedingly large number of available paths, according to an encoded path reference having a relatively limited size or number of bits. Having identified that the path index $P_{idx}$=10, this value may next be encoded into the packets of the packet stream. According to the illustrative example, the path index $P_{idx}$ may be encoded into a MAC of a destination address (DA), i.e., a MAC DA. In this example, the first node 708a, as an ingress node, may obtain the path index and encode it into packets of the associated packet stream, e.g., via the MAC DA. By way of example, an encoded MAC DA may be represented by: {AB-CD-EF-00-00-0A}. The last three octets reserved for the path index, in this instance, a hexadecimal value of A representing the path index $P_{idx}$=10.

Figure 7A:
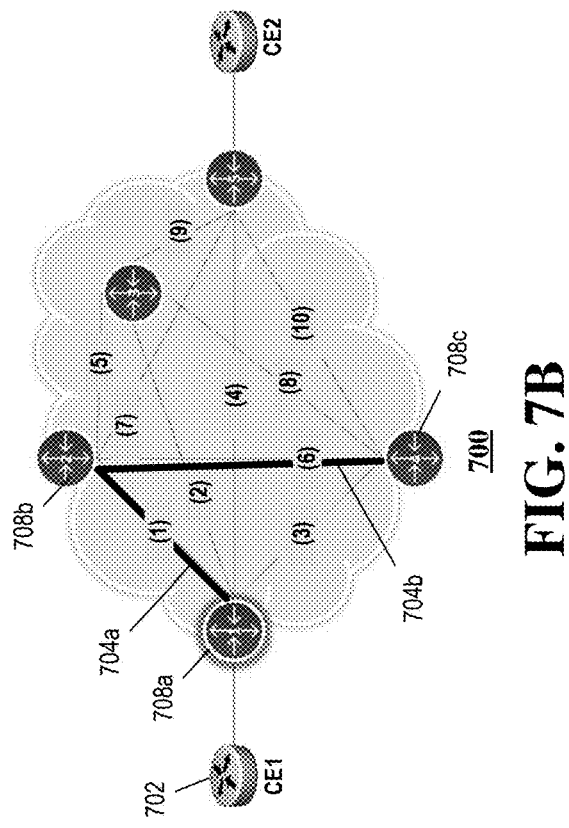
FIGS. 7A through 7D are block diagrams illustrating an example, non-limiting embodiment of progressive forwarding of a path-indexed source message by a five-node mesh network in accordance with various aspects described herein.

Node 1 obtains the $P_{idx}$ of 10 from a MAC DA portion of a packet, then decodes this value to obtain the corresponding path, i.e., path {<1> <2> <4> <5>}. According to the decoded path 704d, the first node 708a forwards to the second node 708b of the path list along a first path segment 704a. Accordingly, all message and/or packet frames having a MAC DA of {AB-CD-EF-00-00-0A}, should be forwarded by the first node 708a, out of port (1) towards the second node 708b, according to Eq. I, as illustrated in FIG. 7A.

It is worth noting here, that all nodes of the mesh network are able to access an indication of the network topology. This may include node identifiers and port and/or path segment identifiers between nodes according to the mesh network arrangement. An example network topology record or reference of the example 5-node fully meshed network is provided in a network configuration table 600 (FIG. 6). According to the node configuration table, a network connection and/or path and/or path segment between the first node 708a and the second node 708b corresponds to port 1 and/or path segment (1). Port, path and/or path segments between any pair of nodes of the example 5-node fully meshed network may be obtained in a similar manner according to the network configuration table 600.

Figure 7B:
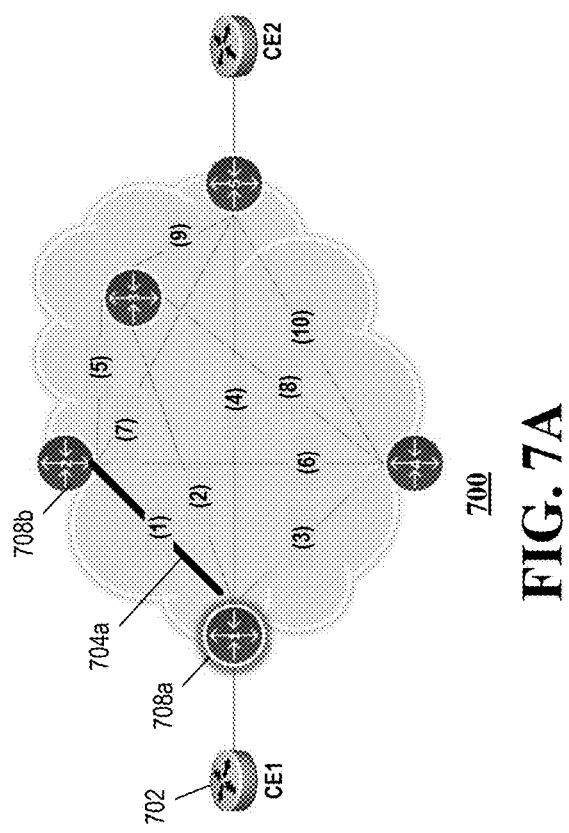

Continuing with the illustrative example, when the second node 708b receives a message or packet frame with MAC DA of {AB-CD-EF-00-00-0A}, it will decode the path index $P_{idx}$ to obtain the same result of 10 associated with its corresponding path, i.e., path {<1> <2> <4> <5>}. Accordingly, all message and/or packet frames having a MAC DA of {AB-CD-EF-00-00-0A} that are received by the second node 708b, should be forwarded by the second node 708b, out of port (6) along a second path segment 704b towards the fourth node 708c, according to Eq. I, as illustrated in FIG. 7B. Port (6) may be obtained from the network configuration table 600 corresponding to the second-node-to-fourth-node node pair.

Figure 7C:
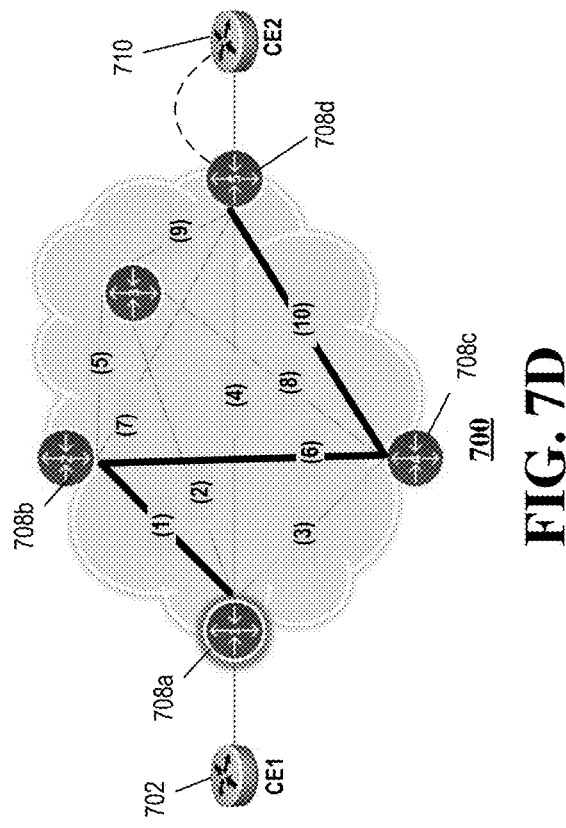

The fourth node 708c, in response to receiving a message or packet frame with MAC DA of {AB-CD-EF-00-00-0A}, will decode the path index $P_{idx}$ to obtain the same result of 10 associated with its corresponding path, i.e., path {<1> <2> <4> <5>}. Accordingly, all message and/or packet frames having a MAC DA of {AB-CD-EF-00-00-0A} that are received by the fourth node 708c, should be forwarded by fourth node 708c, out of port (10) along a third path segment 704c towards the fifth node 708d, according to Eq. I, as illustrated in FIG. 7C. Port (10) may be obtained from the network configuration table 600 corresponding to the node fourth-node-to-fifth-node node pair.

Figure 7D:
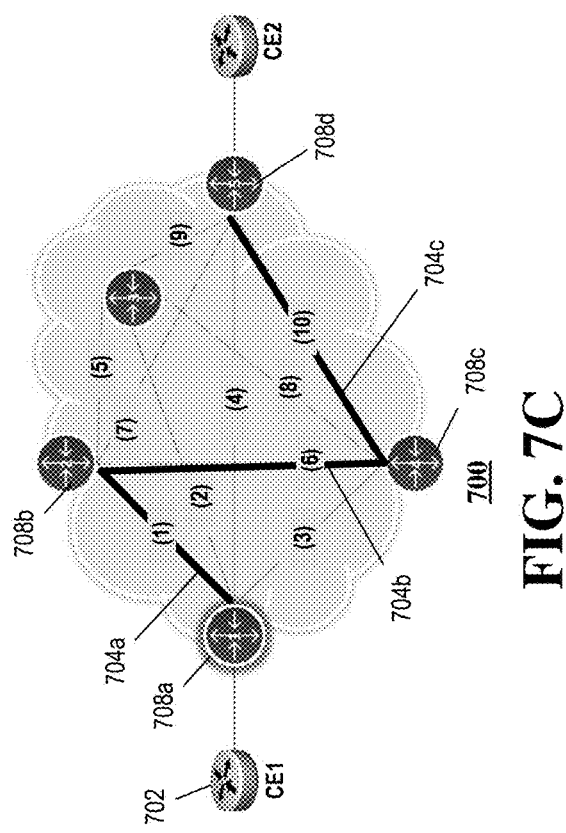

The fifth node 708*d*, receives a message or packet frame with MAC DA of {AB-CD-EF-00-00-0A}, will decode the path index $P_{idx}$ to obtain the same result of 10 associated with its corresponding path, i.e., path {<1> <2> <4> <5>}. As a last node in the list of nodes of the example path, the fifth node 708*d* identifies itself as a terminating node, or egress node for the associated message or packet frame. Accordingly, all message and/or packet frames having a MAC DA of {AB-CD-EF-00-00-0A} that are received by the fifth node 708*d*, may be terminated and/or otherwise passed out from the mesh network to an appropriate destination, such as an appropriate user network interface (UNI), e.g., CE2, according to Eq. I, as illustrated in FIG. 7D.

An example pseudo code of one embodiment of a path index encoding algorithm is provided in Table 3. It is envisioned that the encoding may be performed by one or more of any of the various network devices disclosed herein, such as the edge nodes 102, 104 (FIG. 1), the mesh network nodes 108 and/or some other device, such as a centralized coding device 120 (shown in phantom).

TABLE 3

Path Index Decoder Pseudo-Code.

```
// Assume have Path index (Pidx)
Range (1) .lower = 1
Range (1) .window = Int (NP / Nodes)
Range (1) .upper = Range (1) .lower + Range (1) .window – 1
// PathVector contains list of Nodes encoded by the Pidx
PathVector (1) = Int (Pidx / (Range(1) .window + 1) ) + 1
PathVectorSize=1
PidxPrime = Pidx – ( (PathVector (1) – 1) * Range (1) .window)
For k = 2 To Nodes // Nodes is number of nodes in Network
   If k > 2 Then
      Range (k) .window = Int ( (Range (k – 1) .window – 1) /
(Nodes – (k – 1) ) )
   Else
      Range (k) .window = Int (Range (k – 1) .window / (Nodes – (k
– 1) ) )
   End If
   Remove PathVector (k-1) from the NodeList
   For j = 1 To NodeListSize
      If k > 2 Then
         Range (k) .lower = ( ( (j – 1) * Range (k) .window) +
Range (k – 1) .lower) + 1
      Else
         Range (k) . lower = ( (j – 1) * Range (k) .window) +
Range (k – 1) .lower
      End If
      Range (k) .upper = Range (k) .lower + Range (k) . window – 1
      If IsInRange (Range (k) .lower, Range (k – 1) . lower,
Range (k – 1) .upper) Then
         If IsInRange (PidxPrime, Range (k) . lower,
Range (k) .upper) Then
            PathVectorSize++
            PathVector (PathVectorSize) = NodeList (j)
            Exit For
         End If
      End If
   Next j
Next k
// List of nodes associate with Pidx is found in PathVector
```

An example pseudo code of one embodiment of a path index decoding algorithm is provided in Table 4. It is envisioned that the decoding may be performed by one or more of any of the various network devices disclosed herein, such as the edge nodes 102, 104 (FIG. 1), the mesh network nodes 108 and/or some other device, such as a centralized coding device 120 (shown in phantom).

TABLE 4

Remove Path Vector Routine Pseudo-Code.

```
// Routine: Remove PathVector (k–1) from NodeList
exclude = PathVector (k – 1)
s = 0
For i = 1 To NodeListSize
   If NodeList (i) < > exclude Then
      s++
      NodeList (s) = NodeList (i)
   End If
Next i
NodeListSize = s
```

Figure 8:
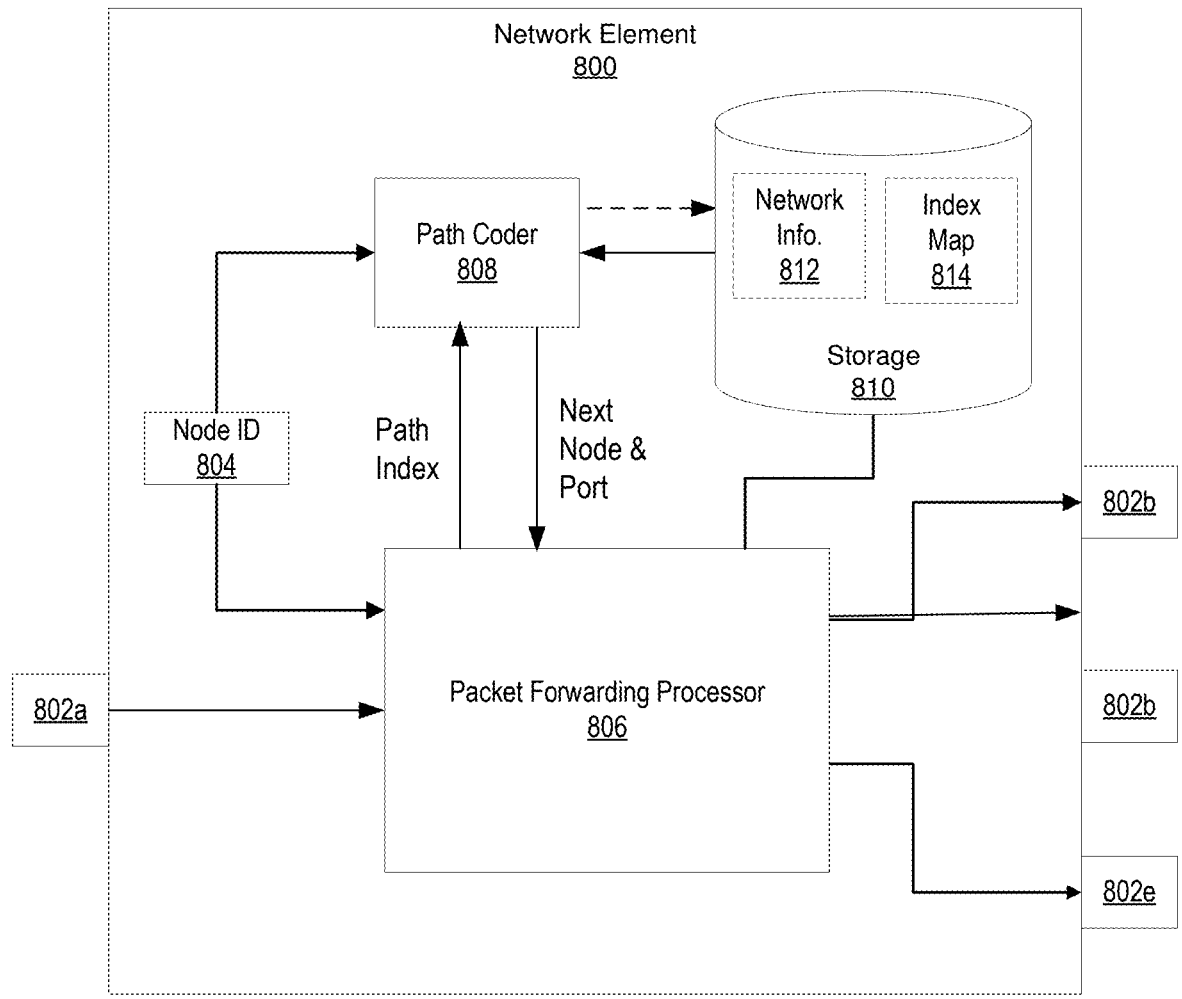
FIG. 8 is a block diagram illustrating, in more detail, an example, non-limiting embodiment of a network element for path-indexed source routing in accordance with various aspects described herein.

FIG. 8 is a block diagram illustrating, in more detail, an example, non-limiting embodiment of a network element 800 configured for path-indexed source routing in accordance with various aspects described herein. The example network element 800 includes a message forwarding processor 806 and a number of ports configured for interconnection and or communication with other network elements not shown. In more detail the network element 800 includes four ports 802*a*, 802*b*, 802*c*, 802*d*, generally 802, which enable the network processor 800 to operate within a five-node fully meshed network, e.g., each port 802 having a connection, path or link to another port of a respective one of the other five network elements. The packet forwarding processor 806 may be configured to receive, process, and/or forward messages, e.g., in the form of framed packets of information.

In at least some embodiments, the network element 800 may be configured to operate according to a source routing (SR) protocol in which an identifier of a preferred network path is encoded within a message by a source network element. A source network element may identify a particular network path prescribed to carry the message and forward the message to a next network element or node along the particular path. The next node along the path, upon receiving the message, may repeat the deciding and forwarding process, e.g., by determining the particular network path, identifying a next, next node in the path, forwarding the message along to the next, next node, and so on, until the message arrives at a terminating point, such as an edge or egress node of the particular network path.

According to the example techniques disclosed herein, a source routing protocol may include an encoded path indicator such as a path index value or reference number. The Example network element 800 may represent any of the network elements along the particular path prescribed for the example message. In at least some embodiments, the network element 800 includes a node identifier 804. The node identifier 804 may include a logical value, e.g., assigned by a network operator, an equipment identifier, MAC address, and/or any other suitably unique identifying reference as may be stored locally and/or hard coded at the network element 80.

In at least some embodiments, the network element 800 includes a path coding processor 808. The path coding processor 808 may be in communication with the packet forwarding processor 806 and provided with the node identifier 804. According to the illustrative embodiment, the network element 800 may also include a storage element 810. The storage element 810 may include a memory, a register or any other suitable device configured for storing information relevant to operation of the path coding processor 808. For example, the storage element 810 may store information related to a description of a network topology within which the network element 800 operates, such as the example network topology table 600 (FIG. 6).

In operation as a decoding network element 800, the packet forwarding processor 806 receives a message via first port 802*a*. The packet forwarding processor 806 may be configured to determine that the received message includes an encoded path identifier, such as a path index $P_{idx}$. The path forwarding processor 806 provides the path index to the path coding processor 808. The path coding processor 808, responsive to receiving the path index, may perform a decoding process based on one or more of the path index value, the node identifier 804, and network topology information 812, as may be stored within the storage element 810. The path coding processor 808, according to the decoding process, identifies a next node along a particular path corresponding to the path index of the received message. The path coding processor 808 provides an indication of the next node along the particular path to the packet forwarding processor 806 which may proceed to forward the packet to the next node along the particular path according to a networking protocol utilized by the example fully meshed network.

In at least some embodiments, the packet forwarding processor 806 may be in communication with the storage element 810. The packet forwarding processor 806, having received an indication of the next node of the particular path from the path coding processor 808, may identify an appropriate port, path and or connection between the network element 800 and the next node of the particular path. Alternatively, or in addition, the path coding processor 808 may provide the appropriate port, path and/or connection to along with an identification of the next node along the particular path. The message forwarding processor 806 may then forward the message to the next node along the particular path via the identified port and or connection 802.

In at least some embodiments, the network element 800, along with other network elements of a fully meshed network, may independently perform the aforementioned decoding process responsive to receipt of a message with SR encoding. In at least some embodiments, the decoding process is based on an algorithm adapted to identify a next node along a predetermined path based on and encoded value such as the example path index, provided within the message by a source node. Alternatively, or in addition, the decoding process may be based at least partly upon referencing a correlation between encoded values such as the example path index, and their corresponding particular network paths. It is envisioned that in at least some embodiments, the storage element 810 may retain at least a portion of such a correlation, e.g., a path index map 814 to pass reference listing. In such instances the correlation records or tables may be determined in whole or in part by the network element 800, by one or more other network elements, and or by some other device such as a centralized decoding processor.

Figure 9A:
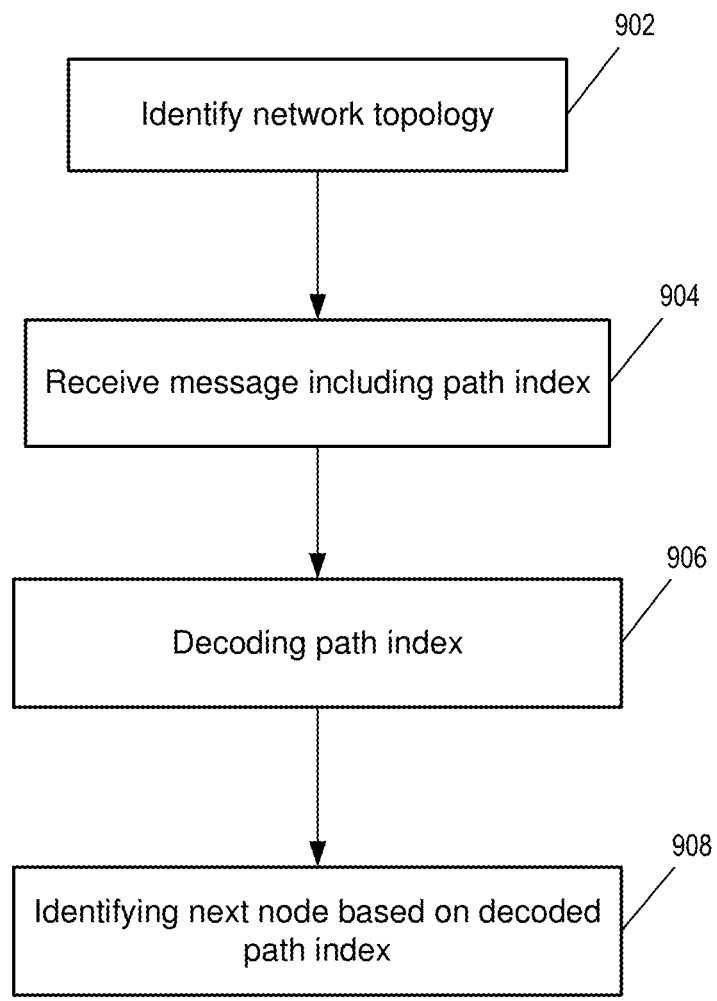
FIG. 9A depicts an illustrative embodiment of a path-indexed source routing process in accordance with various aspects described herein.

FIG. 9A depicts an illustrative embodiment of a path-indexed source routing process 900 in accordance with various aspects described herein. The process 900 includes identifying a network topology at 902. The network topology may include one or more of an identification of network elements, also referred to herein as nodes of a network, and identification of connections between nodes. Node and/or connection identifiers may include logical reference values, such as names and/or numbers, equipment identifiers, including identifiers of virtual equipment as may be employed in a software designed network (SDN) and/or a cloud computing environment, and/or port numbers corresponding to network connections. As a network topology may change, it is envisioned that the identification of the network topology may be updated from time to time, e.g., according to a schedule and/or event, such as detection of and/or reporting of a network failure, failover and/or reconfiguration.

According to the example process, a message including a path index may be received at 904. The message may include data messages, e.g., packets, that may include a payload portion adapted for transporting data as may be undertaken in the context of an application or service and/or an overhead portion, such as a packet header that may contain information relevant to a handling, e.g., routing of the packet through the network. In at least some embodiments, a source routing technique is used to include a network path reference, such as a path index, into the message, e.g., in an overhead portion such as a packet header. According to the novel technique disclosed herein, the path index may be obtained according to a particular process that arranges paths, e.g., all possible unique paths, supported by the network. In particular, the arrangement may be achieved according to an algorithm, such as prioritized node walk.

The path index obtained from the received message may decoded at 906. The decoding may be accomplished by an algorithm that is aware of the encoding algorithm, e.g., the prioritized node walk algorithm. Accordingly, the path index, together with the identified network topology may be used to identify the particular path associated with the path index. It is understood that the particular path may include network instructions and/or an ordered sequence of network nodes, and/or a sequence of network paths between the nodes of the particular path. In at least some embodiments, the decoding may be performed at least in part along the particular path, e.g., by any node and/or combination of nodes including a current node at which the message was received. In at least some embodiments, the decoding may be performed in real time, e.g., responsive to receipt of the message. It is envisioned that in at least some embodiments, the decoding may be performed in whole or in part by another device, such as a centralized coding device, which may be accessible to one or more nodes of the particular path.

A next node of the network path may be identified based on the decoded path index at 908. The message progresses along the particular network path from node to node according to the sequence of nodes of the particular path. Accordingly at any given node along the path, a node tasked with forwarding the message would be aware of its own identity or reference. Having decoded the path index including a complete listing of nodes, a node engaging in the forwarding may identify a next node as that node identified in the particular path occurring immediately following the current node.

Figure 9B:
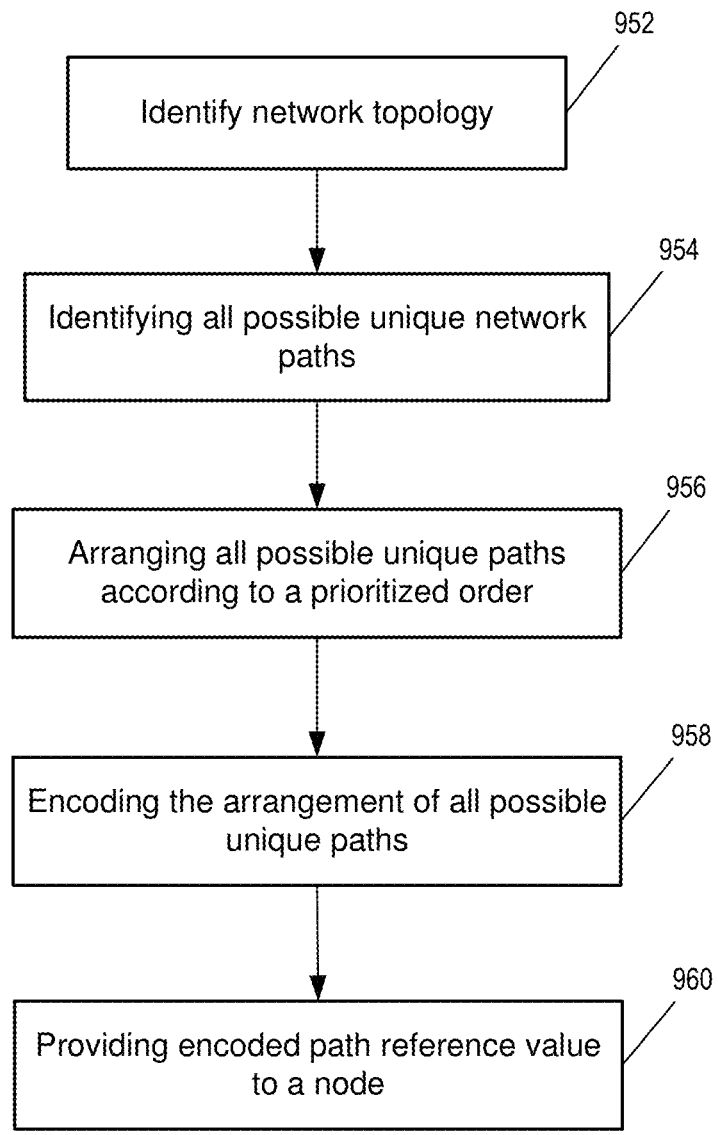
FIG. 9B depicts an illustrative embodiment of another path-indexed source routing process in accordance with various aspects described herein.

FIG. 9B depicts an illustrative embodiment of another path-indexed source routing process 950 in accordance with various aspects described herein. The example process 950 includes identifying a network topology at 952. The network topology may include one or more of an identification of network elements, also referred to herein as nodes of a network, and identification of connections between nodes. Node and/or connection identifiers may include logical reference values, such as names and/or numbers, equipment identifiers, including identifiers of virtual equipment as may be employed in a software designed network (SDN) and/or a cloud computing environment, and/or port numbers corresponding to network connections. As a network topology may change, it is envisioned that the identification of the network topology may be updated from time to time, e.g., according to a schedule and/or event, such as detection of and/or reporting of a network failure, failover and/or reconfiguration.

According to the example process 950, a number of unique network paths are identified, at 954. The unique paths include all possible unique network paths supported by the identified network topology. For example, all possible unique paths may be identified according to any of the example techniques disclosed herein, such as the prioritized node walks illustrated and discussed in relation to FIG. 2 or FIG. 3. The number of unique network paths may be arranged, at 956, according to a prioritized order based on node labels of the plurality of nodes to obtain an arranged plurality of unique network paths. By way of example, such arrangements may be obtained according to the techniques disclosed herein, such as the prioritized node walks illustrated and discussed in relation to FIG. 2 and FIG. 3.

According to the example process 950, the arranged number of unique network paths may be encoded, at 958, into number of encoded path reference values. In at least some embodiments, the encoding includes associating each of the arranged number of unique network paths with a single reference value, such as a number or label. By way of example, a reference value may include an index variable assigned to each of the arranged unique paths.

Further according to the example process 950, an encoded path reference value provided, at 960, to a node of the number of nodes to facilitate identification of a particular unique network path of the number of unique network paths according to the encoded path reference value and without providing further network instruction related to the unique network path. In some embodiments, a single path reference value associated with a predetermined network path for a particular message or group of messages may be forwarded to one or more nodes along the predetermined network path. Such forwarding may occur by incorporation of the path reference value into a message, e.g., into a header portion of a message frame.

Alternatively, or in addition, any portion of the arrangement of unique paths may be provided to one or more nodes of the network topology. For example, a complete table of all unique paths may be provided to one or more nodes of the network, along with associated reference values to permit nodes of the network to decode a path reference value by reference to the table values. In at least some embodiments, subsets of a complete table of all unique paths may be provided to one or more nodes of the network topology. For example, a subset of all unique paths including a particular node along a path may be forwarded to the particular node, without necessarily forwarding any unique paths that do not include the particular node. Beneficially, this would reduce any storage requirements for the particular node as it would not retain any network path information for which it would not be a participant.

While for purposes of simplicity of explanation, the respective processes 900, 950 are shown and described as series of blocks in FIGS. 9A and 9B it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 10:
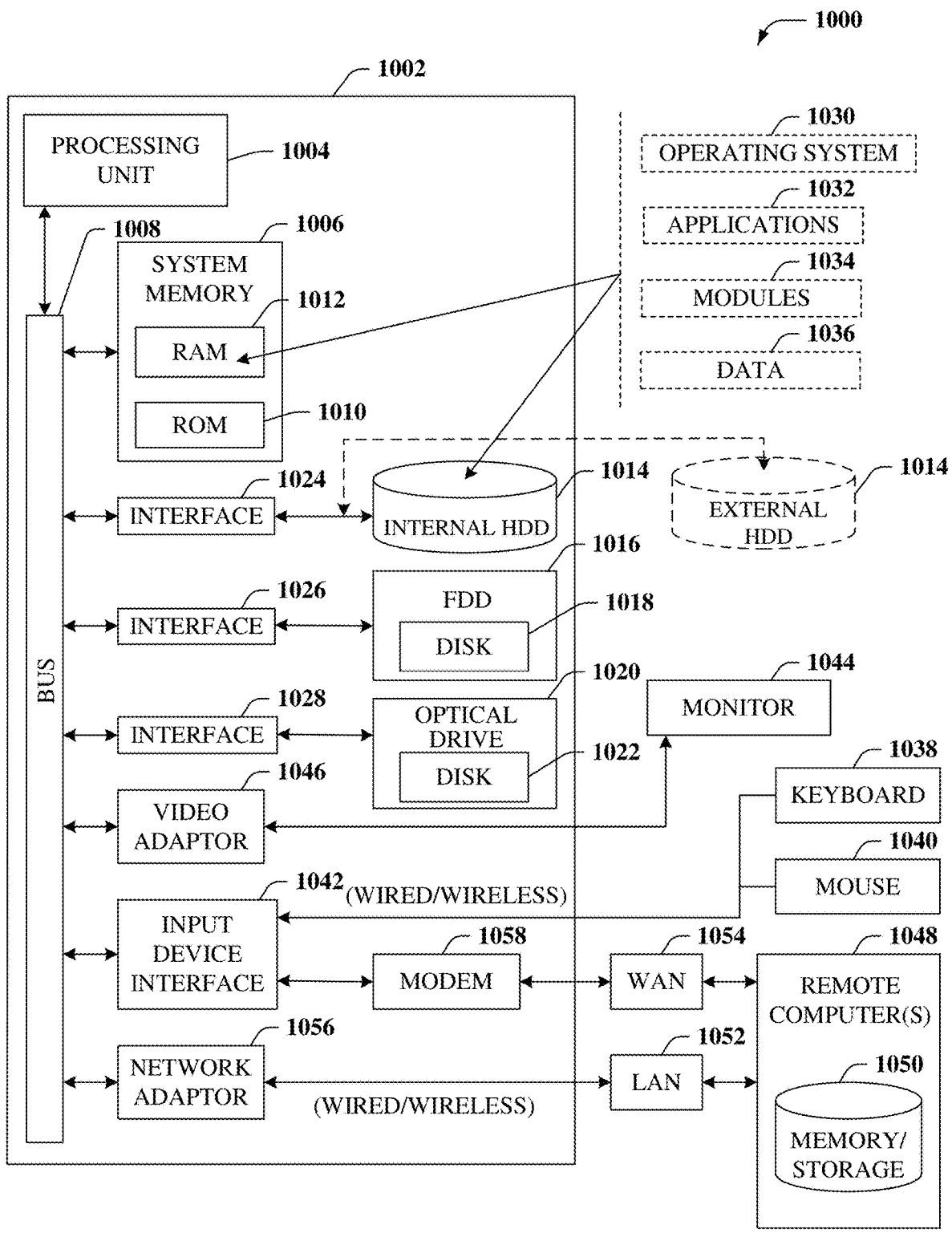
FIG. 10 is a block diagram of an example, non-limiting embodiment of a computing environment in accordance with various aspects described herein.

Turning now to FIG. 10, there is illustrated a block diagram of a computing environment 1000 in accordance with various aspects described herein. In order to provide additional context for various embodiments of the embodiments described herein, FIG. 10 and the following discussion are intended to provide a brief, general description of a suitable computing environment 1000 in which the various embodiments of the subject disclosure can be implemented. For example, computing environment 1000 can facilitate in whole or in part identifying a network topology and obtaining path index that corresponds to a particular network path of an indexed arrangement of unique paths of the network topology, such that a decoding of the path index identifies a next node along the network path. Alternatively, or in addition, the computing environment 1000 can facilitate in whole or in part generating an indexed arrangement of unique paths of a network topology and their corresponding path indexes, such that a decoding of any of the path indexes identifies a next node along the corresponding network path.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment can comprise a computer 1002, the computer 1002 comprising a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014 (e.g., EIDE, SATA), which internal HDD 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high-capacity optical media such as the DVD). The HDD 1014, magnetic FDD 1016 and optical disk drive 10 20 can be connected to the system bus 1008 by a hard disk drive interface 1024, a magnetic disk drive interface 1026 and an optical drive interface 1028, respectively. The hard disk drive interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen and the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. It will also be appreciated that in alternative embodiments, a monitor 1044 can also be any display device (e.g., another computer having a display, a smart phone, a tablet computer, etc.) for receiving display information associated with computer 1002 via any communication means, including via the Internet and cloud-based networks. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a remote memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the LAN 1052 through a wired and/or wireless communication network interface or adapter 1056. The adapter 1056 can facilitate wired or wireless communication to the LAN 1052, which can also comprise a wireless AP disposed thereon for communicating with the adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are examples and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to" and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a network topology comprising a plurality of nodes and a plurality of segment reference values corresponding to network segments between pairs of nodes of the plurality of nodes;
receiving a message comprising a path index, wherein the path index corresponds to a particular network path of an indexed arrangement of unique paths, the particular network path comprising a particular sequence of nodes of the plurality of nodes corresponding to the path index;
decoding the path index to obtain a decoding of the particular network path; and
identifying a next node according to the decoding of the particular network path to obtain an identified next node, wherein the message is forwarded to the identified next node.

2. The device of claim 1, wherein the decoding is performed at a node of the plurality of nodes of the particular network path.

3. The device of claim 2, wherein the decoding is performed in real time.

4. The device of claim 2, wherein all nodes of the plurality of nodes apply a common decoding algorithm according to a current network topology.

5. The device of claim 1, wherein the plurality of nodes is ordered according to node label values to obtain an ordered plurality of nodes.

6. The device of claim 5, wherein the particular network path comprising a particular sequence of nodes of the plurality of nodes is determined according to a prioritized traversal of a graph of the network topology and the ordered plurality of nodes.

7. The device of claim 1, wherein the path index is encoded into a header portion of the message.

8. The device of claim 7, wherein the path index is encoded into a destination media access control (MAC) address of the header portion of the message.

9. The device of claim 1, wherein the decoding is performed at a centralized location, the operations further comprising:
identifying a group of nodes of the plurality of nodes, wherein the group of nodes is associated with the particular network path; and
distributing the decoding of the particular network path to at least one node of the group of nodes.

10. The device of claim 1, wherein the operations further comprise:
applying at least a portion of an ordered progression through the plurality of nodes of the network topology, wherein the ordered progression is configured to sequentially determine a plurality of unique, sequential network paths according to the network topology;
incrementing an index associated with each sequential network path of the plurality of unique, sequential network paths to obtain an incremented index; and
encoding each sequential network path of the plurality of unique, sequential network paths according to the incremented index.

11. The device of claim 1, wherein the operations further comprise:
forwarding the message to the identified next node.

12. The device of claim 1, wherein the path index is logarithmically related to a total number of unique paths of the indexed arrangement of unique paths supported by the network topology.

13. The device of claim 1, wherein the identifying the network topology further comprises initiating a network discovery process.

14. The device of claim 13, wherein the operations further comprise:
determining a change in the network topology; and
re-initiating the network discovery process responsive to the determining the change, to obtain a revised network topology.

15. A non-transitory machine-readable medium, comprising executable instructions that, when executed by a processing system including a processor, facilitate performance of operations, the operations comprising:
identifying a network topology comprising a plurality of nodes and a plurality of segment reference values corresponding to network segments between pairs of nodes of the plurality of nodes;
identifying a plurality of unique network paths comprising all possible unique network paths supported by the network topology;
arranging the plurality of unique network paths according to a prioritized order based on node labels of the plurality of nodes to obtain an arranged plurality of unique network paths;
encoding the arranged plurality of unique network paths into plurality of encoded path reference values; and
providing an encoded path reference value to a node of the plurality of nodes to facilitate identification of a particular unique network path of the plurality of unique network paths according to the encoded path reference value and without providing further network instruction related to the unique network path.

16. The non-transitory machine-readable medium of claim 15, wherein the nodes are ordered according to node label values to obtain an ordered plurality of nodes, and wherein the arranging the plurality of unique network paths further comprises:
performing a prioritized traversal of a graph of the network topology and the ordered plurality of nodes.

17. The non-transitory machine-readable medium of claim 16, wherein the performing the prioritized traversal of the graph further comprises:
repeating, sequentially, the prioritized traversal of the graph for each unique network path of the plurality of unique network paths; and
incrementing an index value to obtain an incremented index value associated with each sequential network path of the plurality of unique network paths, wherein the encoding the arranged plurality of unique network paths is based on the incremented index value.

18. A method, comprising:
identifying, by a processing system including a processor, a network topology comprising a plurality of nodes and a plurality of segment reference values corresponding to network segments between pairs of nodes of the plurality of nodes;
receiving, by the processing system, a message comprising a path index, wherein the path index corresponds to a particular network path of an indexed arrangement of unique paths, the particular network path comprising a particular sequence of nodes of the plurality of nodes corresponding to the path index;

decoding, by the processing system, the path index to obtain a decoding of the particular network path; and identifying, by the processing system, a next node according to the decoding of the particular network path to obtain an identified next node, wherein the message is forwarded to the identified next node.

19. The method of claim 18, wherein the nodes are ordered according to node label values to obtain an ordered plurality of nodes, and wherein the particular network path comprising a particular sequence of nodes of the plurality of nodes is determined according to a prioritized traversal of a graph of the network topology and the ordered plurality of nodes.

20. The method of claim 18, further comprising:

applying, by the processing system, at least a portion of an ordered progression through the plurality of nodes of the network topology, wherein the ordered progression is configured to sequentially determine a plurality of unique, sequential network paths according to the network topology;

incrementing, by the processing system, an index associated with each sequential network path of the plurality of unique, sequential network paths to obtain an incremented index; and encoding each sequential network path of the plurality of unique, sequential network paths according to the incremented index.

\* \* \* \* \*